US009186994B2

(12) United States Patent
Okuyama et al.

(10) Patent No.: US 9,186,994 B2
(45) Date of Patent: Nov. 17, 2015

(54) VEHICLE INPUT APPARATUS

(71) Applicant: HONDA MOTOR CO., LTD., Tokyo (JP)

(72) Inventors: Haruko Okuyama, Utsunomiya (JP); Takeyuki Suzuki, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 90 days.

(21) Appl. No.: 13/661,403

(22) Filed: Oct. 26, 2012

(65) Prior Publication Data
US 2013/0106693 A1 May 2, 2013

(30) Foreign Application Priority Data

Oct. 31, 2011 (JP) ................... 2011-238761

(51) Int. Cl.
*B60K 37/06* (2006.01)
*G06F 3/0488* (2013.01)
(Continued)

(52) U.S. Cl.
CPC ............ *B60K 37/06* (2013.01); *G06F 3/03547* (2013.01); *G06F 3/0482* (2013.01); *G06F 3/0485* (2013.01); *G06F 3/04883* (2013.01); *B60K 2350/1052* (2013.01);
(Continued)

(58) Field of Classification Search
CPC ............. G09G 2300/026; G09G 2300/02; G09G 2360/04; G09G 2360/06; G09G 2340/0407; F06F 3/0416; F06F 3/04883; F06F 3/03547; G06F 2203/0382; G06F 3/044; G06F 3/04886; G06F 3/04892; G06F 2203/04803; G06F 3/041

USPC ................. 345/156, 173-179, 157; 178/18.01-18.09; 463/37-38; 715/704-715
See application file for complete search history.

(56) References Cited

U.S. PATENT DOCUMENTS 5,881,169 A * 3/1999 Henry, Jr. ...................... 382/187
6,373,472 B1 * 4/2002 Palalau et al. ................. 345/173
(Continued)

FOREIGN PATENT DOCUMENTS

JP 11-105646 4/1999
JP 2000-010726 1/2000
(Continued)

OTHER PUBLICATIONS

Japanese Office Action with English Translation, dated Aug. 13, 2013, 4 pages.
(Continued)

*Primary Examiner* — Md Saiful A Siddiqui
(74) *Attorney, Agent, or Firm* — Rankin, Hill & Clark LLP

(57) ABSTRACT

A vehicle input apparatus includes a display screen that displays a cursor that indicates an operation item with respect to a predetermined operation object, an input device that outputs signals according to a sliding operation using the fingers of an operator on an operation surface, and a display control portion that controls movement of the cursor on the display screen according to the signals that are output from the input device. The display screen includes a plurality of display areas that are divided according to the number of the plurality of operation surfaces, and each of the plurality of operation surfaces is associated with a separate display area, and an operation range is set on the display screen so that the cursor can only be moved within the range of the respective associated separate display area.

4 Claims, 16 Drawing Sheets

(51) Int. Cl.
*G06F 3/0482* (2013.01)
*G06F 3/0485* (2013.01)
*G06F 3/0354* (2013.01)

(52) U.S. Cl.
CPC .... *B60K 2350/901* (2013.01); *B60K 2350/928* (2013.01); *G06F 2203/04803* (2013.01)

(56) References Cited

U.S. PATENT DOCUMENTS

| | | | |
|---|---|---|---|
| 6,784,869 B1* | 8/2004 | Clark et al. | 345/156 |
| 2006/0227065 A1 | 10/2006 | Yukawa et al. | |
| 2010/0103127 A1* | 4/2010 | Park et al. | 345/173 |
| 2010/0188343 A1* | 7/2010 | Bach | 345/173 |
| 2010/0268426 A1* | 10/2010 | Pathak et al. | 701/48 |
| 2010/0328206 A1* | 12/2010 | Morin et al. | 345/157 |
| 2011/0050589 A1 | 3/2011 | Yan et al. | |
| 2012/0117501 A1* | 5/2012 | Koch et al. | 715/769 |

FOREIGN PATENT DOCUMENTS

| | | |
|---|---|---|
| JP | 2002-312122 | 10/2002 |
| JP | 2009-298285 | 12/2009 |
| WO | 2011/096166 A1 | 8/2011 |

OTHER PUBLICATIONS

European Search Report, Application No. 12190335.5, dated Mar. 22, 2013, 4 pages.

* cited by examiner

VEHICLE INPUT APPARATUS

CROSS-REFERENCE TO RELATED APPLICATION

Priority is claimed on Japanese Patent Application No. 2011-238761, filed on Oct. 31, 2011, the content of which is incorporated herein by reference.

BACKGROUND OF THE INVENTION

1. Field of the Invention

The present invention relates to a vehicle input apparatus.

2. Description of Related Art

In the related art, for example, on-vehicle equipment is disclosed in which a sliding operation using the fingertip of a driver is performed on a touch pad (slide pad) disposed on a steering wheel in a state where a plurality of menu items are displayed on a monitor, and according to this, a cursor is moved with respect to the plurality of menu items and a desired menu item can be selected (for example, refer to Japanese Unexamined Patent Application, First Publication No. H11-105646).

However, in the on-vehicle equipment according to the related art, a touch pad is disposed at the center portion of a steering wheel, and thereby, an operation range (area) of an operation surface is widely secured. However, it is necessary for a driver to remove one hand from the steering wheel at the time of a sliding operation, and there is a problem in that the operability is deteriorated.

In order to solve such a problem, for example, in the related art, an input apparatus in which a touch pad is disposed on a spoke portion of a steering wheel is disclosed (for example, refer to Japanese Unexamined Patent Application, First Publication No. 2009-298285).

However, in an input apparatus according to the related art, due to the shape of a steering wheel or other switches that are present in the periphery of the spoke portion, there is a problem in that it is difficult to sufficiently secure the area of the operation surface of the touch pad.

SUMMARY OF THE INVENTION

In on-vehicle equipment and an input apparatus according to the related art, for example, when a cursor that is displayed on a screen is moved according to a sliding operation using the fingertip of an operator on the touch pad, if the entire display area of the screen is set to an operation object range (that is, a movable range of the cursor) so as to correspond to a single touch pad, there is a problem in that operability is decreased.

For example, in order to move a cursor over the entire display area of the screen in a single sliding operation on the single touch pad, compared to a case where repeating a sliding operation a plurality of times in a predetermined direction on the touch pad is required, it is necessary to increase a cursor movement degree on the screen corresponding to the degree of the sliding operation on the touch pad.

However, if it is difficult to sufficiently secure the area of the operation surface compared to a case where the area of the operation surface can be sufficiently secured, due to the fact that the cursor movement degree with respect to the degree of the sliding operation is increased, a delicate sliding operation is required, and there is a problem in that ease of operation is decreased.

On the other hand, in a case where repeating a sliding operation a plurality of times in a predetermined direction on the touch pad is required, in order to move the cursor over the entire display area of the screen (that is, a case where the cursor movement degree on the screen corresponding to the degree of the sliding operation on the touch pad is not increased), if it is difficult to sufficiently secure the area of the operation surface, compared to the case where the area of the operation surface can be sufficiently secured, the number of times that a sliding operation must be repeated until a desired cursor movement is completed is increased and the time that is required for the sliding operation is increased, and there is a problem in that operability is decreased.

An aspect according to the present invention is made in consideration of the above-described circumstances, and an object thereof is to provide a vehicle input apparatus capable of decreasing the size of an operation surface while securing improved operability.

An aspect according to the present invention includes the following means for achieving the object related to solving the problems.

(1) A vehicle input apparatus according to an aspect of the present invention includes: a display screen that displays a cursor that indicates an operation item with respect to a predetermined operation object; an input device that outputs signals according to a sliding operation using the fingers of an operator on an operation surface; and a display control unit that controls movement of the cursor on the display screen according to the signals that are output from the input device, wherein the input device includes a plurality of the operation surfaces that are disposed at a plurality of different positions within a range which is reachable by the fingers of an operator sitting in a driver's seat of the vehicle, the display screen includes a plurality of display areas that are divided according to the number of the plurality of operation surfaces, and each of the plurality of operation surfaces is associated with separate display areas, and an operation range is set on the display screen so that the cursor can only be moved within the range of the respective associated separate display areas.

(2) In the aspect of (1), the display area and the operation range may be set so as to correspond according to an absolute coordinate, and the operation ranges that are associated with adjacent display areas may be set so as to overlap each other in the vicinity of a boundary of the adjacent display areas with respect to the plurality of display areas and the plurality of operation ranges.

(3) In the aspect of (1), the display area and the operation range may be set so as to correspond according to an absolute coordinate, and the cursor may be displayed on the display screen at all times or when a sliding operation is performed on the operation surface, and the cursor may be displayed so as to be moved in a direction according to the direction of the sliding operation starting from a position on the display screen corresponding to the operation surface in which a sliding operation is performed and the starting position of a sliding operation on the operation surface regardless of the immediately preceding position of the cursor on the display screen.

(4) In any of aspects (1) to (3), the display screen may be disposed in the front of the driver's seat, may be configured of an approximately rectangular shape of which the longitudinal direction corresponds to the vehicle width direction of a vehicle, and may be divided into the plurality of display areas by a boundary that extends in a direction perpendicular to the longitudinal direction, each of the plurality of operation surfaces may be disposed at predetermined locations on the left side and the right side in a neutral state of a steering wheel that is provided in the vehicle, and in a front view of the display screen, a left side display area among the plurality of display areas may be set so as to correspond to the operation range of the operation surface that is disposed on the left side of the steering wheel, and a right side display area among the plurality of display areas may be set so as to correspond to the operation range of the operation surface that is disposed on the right side of the steering wheel.

(5) In any of aspects (1) to (4), the operation item may include a character input frame that causes the predetermined operation object to recognize handwritten characters input by the sliding operation, the cursor may be a pointer that indicates a portion of the character according to the handwritten input being executed in the character input frame, and when the character input frame is displayed on the display screen, the operation range may be set so as to correspond to a range of the character input frame.

According to the aspect of (1), since a movable range (operation range) of the cursor through the separate display areas on the display screen is divided in each of the plurality of operation surfaces, for example, it is not necessary to correspond to only one operation surface to the entire display screen.

Thereby, even when the operation surface is disposed at a place in which it is difficult to sufficiently secure the area of the operation surface, compared to a case where the area of the operation surface can be sufficiently secured, it is possible to remove a need to increase a cursor movement degree on the display screen corresponding to the degree of the sliding operation on the operation surface, and operation accuracy can be improved.

In addition, it is possible to remove a need to repeat a sliding operation by separating the sliding operation over a plurality of times in an objective direction for performing a desired cursor movement instead of increasing the cursor movement degree corresponding to the degree of the sliding operation.

Thereby, both miniaturization of each operation surface and improved ease of operation can be secured.

According to the aspect of (2), in a condition in which the correspondence between the contact position of fingers on the operating surface and the position of the cursor on the display screen is absolute (that is, the correspondence relationship of the reference position such as an origin is not changed), since the operation ranges that are associated with the adjacent display areas overlap, even when the cursor is moved at the vicinity of the boundary of the display area, it is possible to remove a need to perform a sliding operation using the fingers in ends of the operation surface, and improved ease of operation can be secured.

According to the aspect of (3), when a sliding operation using the fingers is performed on the operation surface, the cursor is moved to a predetermined position on the display screen according to the contact position of the fingers on the operation surface regardless of the immediately preceding position of the cursor (for example, the final position at which the most recent movement of the cursor is stopped, or the like).

Thereby, intuitive operation by the operator is possible, and operability can be improved.

According to the aspect of (4), intuitive operation by the operator is possible while securing versatility of the layout of the separate display areas that are associated with each of the plurality of operation surfaces, and operability can be improved.

According to the aspect of (5), with respect to the input of the characters according to handwritten input, since the operation range set with respect to the operation surface and the range of the character input frame correspond, the maximum amount of space for character input on the operation surface can be secured irrespective of the division of the display screen, accuracy at the time of inputting characters can be improved, and operability can be improved.

DETAILED DESCRIPTION OF THE INVENTION

Hereinafter, a vehicle input apparatus according to an embodiment of the present invention will be described with reference to the accompanying drawings.

Figure 1:
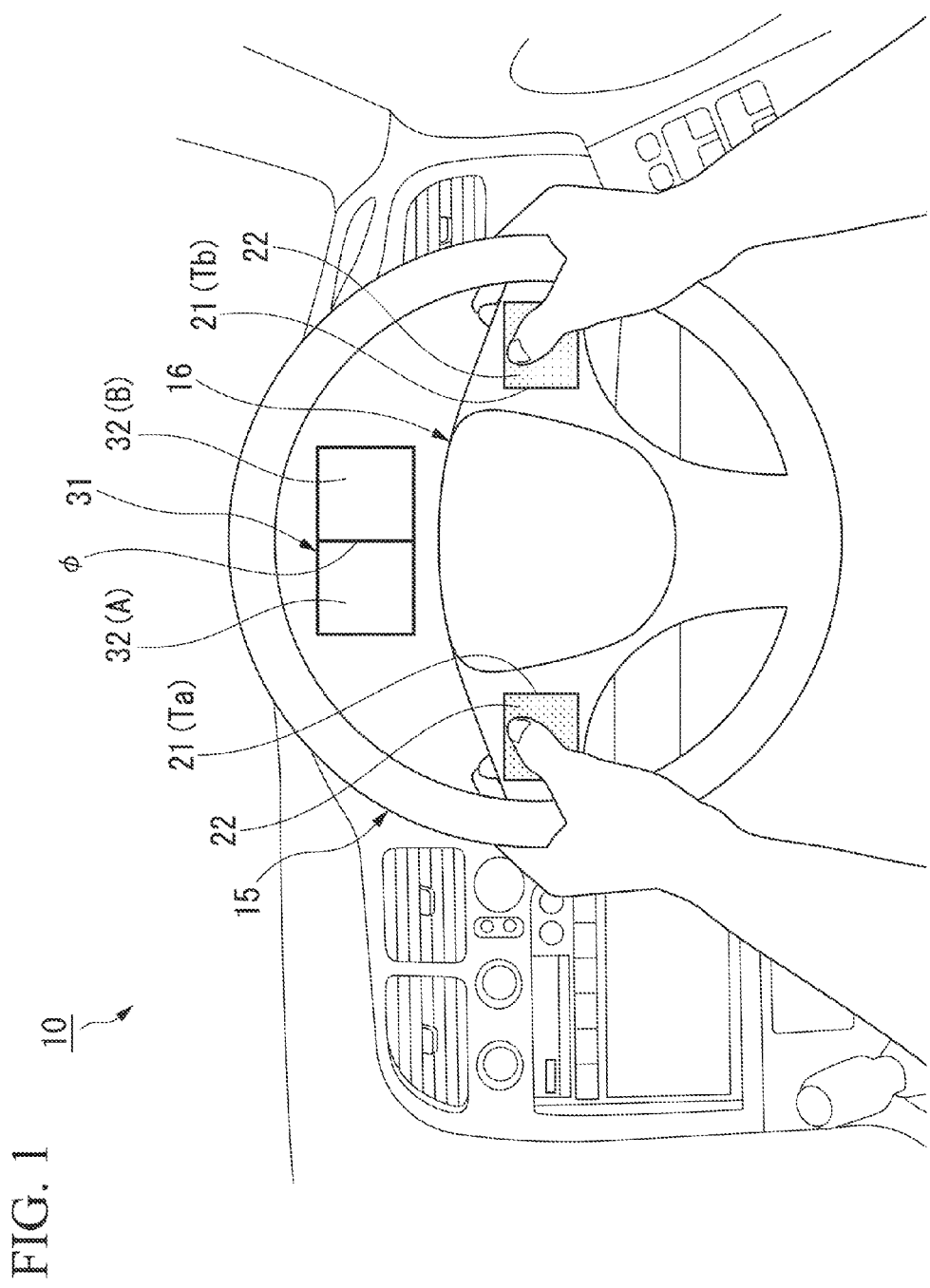
FIG. 1 is a configuration diagram of a vehicle input apparatus according to an embodiment of the present invention.
Figure 2:
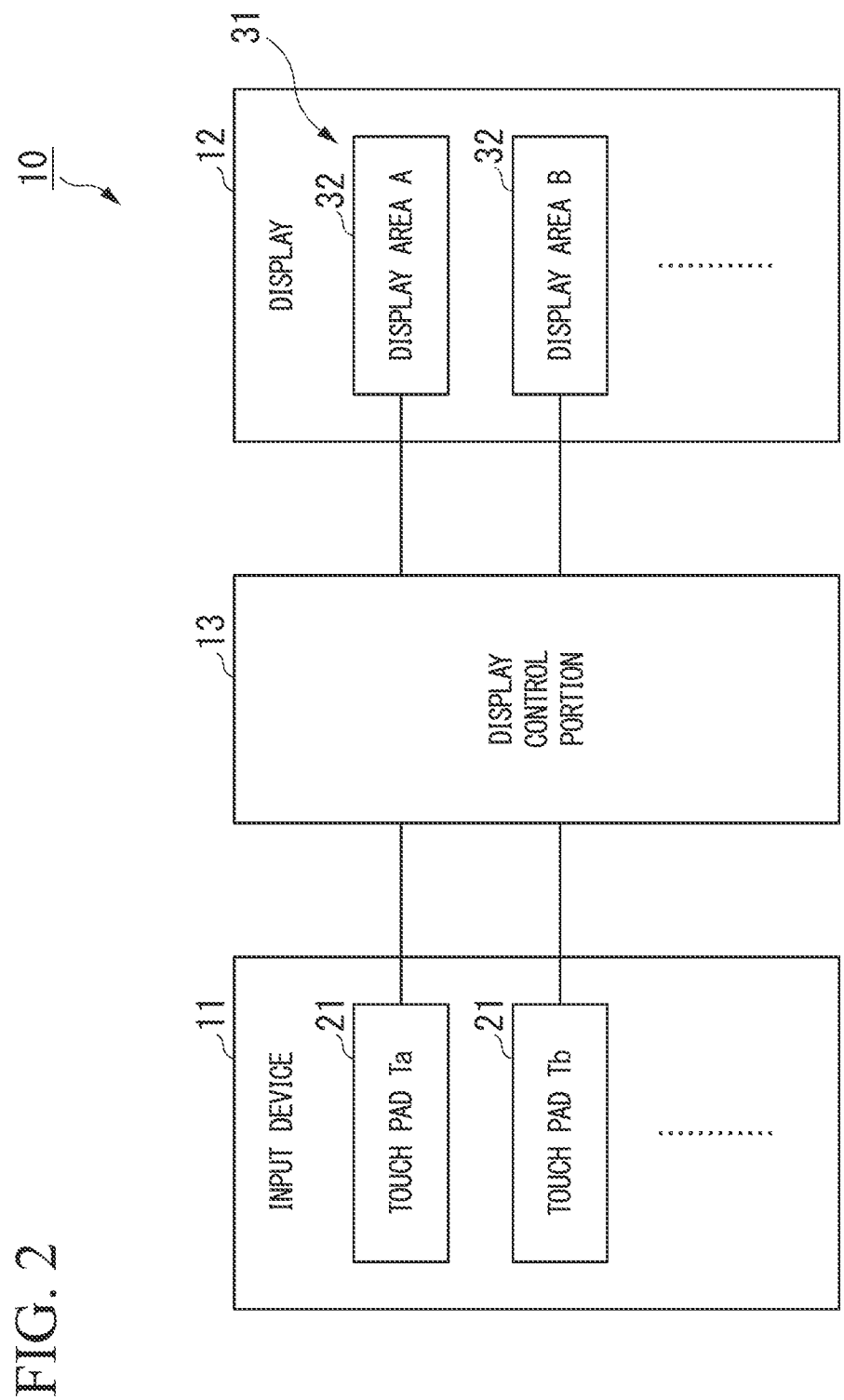
FIG. 2 is a configuration diagram of a vehicle input apparatus according to an embodiment of the present invention.

For example, as shown in FIGS. 1 and 2, a vehicle input apparatus 10 according to the present embodiment is configured so as to include an input device 11, a display 12, and a display control portion (display control unit) 13.

For example, the input device 11 includes a plurality of touch pads 21 (for example, a touch pad Ta, a touch pad Tb, . . . ) that are configured of a touch sensor using a capacitance sensor.

For example, each of the plurality of touch pads 21 includes an operation surface 22 that is disposed at different positions (for example, different positions on a grip portion 16 that is provided on a steering wheel 15 of a vehicle and can be gripped by the fingers of an operator sitting in a driver's seat) within a range which is reachable by the fingers of an operator sitting in a driver's seat (not shown) of a vehicle.

For example, the plurality of operation surfaces 22 are disposed so that the same operator sitting in the driver's seat of the vehicle can perform various contact operations (for example, a sliding operation, a tap operation, a press operation, a gesture operation, and the like) using the fingers on the plurality of operation surfaces 22 in a state of maintaining a predetermined driving posture.

Each of the plurality of touch pads 21 detects operation state quantities (for example, contact position, operation detection and operation degree of sliding operation, presence or absence and operation frequency of a tap operation, presence or absence of a press operation, presence or absence of a gesture operation, and the like) according to various contact operations using the fingers of the operator on the operation surface 22 based on a predetermined coordinate system that is set on the operation surfaces 22, and outputs signals of the detected results.

For example, the display 12 includes a display screen 31 that is disposed so as to be viewed by the operator sitting in the driver's seat of the vehicle.

The display screen 31 includes a plurality of display areas 32 (for example, display area A, display area B, . . . ) that are divided so as to correspond to the number of the operation surfaces 22 of the plurality of touch pads 21 of the input device 11.

The display 12 displays a plurality of operation items with respect to a predetermined operation object (for example, various on-vehicle equipment such as a navigation device, an air conditioner, and an acoustic device that are installed on the vehicle) on the display screen 31 according to a control of the display control portion 13, and displays a cursor, which indicates appropriate operation items only from among the plurality of operation items, on the display screen 31.

Moreover, for example, the display 12 may be a dashboard display in which the display screen 31 is disposed on the upper portion of a dashboard of a vehicle, a heads-up display that performs a display while having a front window of a vehicle as the display screen 31, a multi-information display in which the display screen 31 is disposed on an instrument panel of a vehicle, a display in which the display screen 31 is disposed in the vicinity of various instruments of an instrument panel of a vehicle, or the like.

The display control portion 13 controls the display of the display screen 31 of the display 12 according to the signals of the detected results that are output from each of the plurality of touch pads 21 of the input device 11.

For example, the display control portion 13 controls an absolute value or a relative movement of the cursor with respect to the plurality of operation items on the display screen 31 according to the signals that are output from the input device 11.

The display control portion 13 associates each of the plurality of operation surfaces 22 of the plurality of touch pads 21 of the input device 11 with the separate display area 32 with respect to the plurality of display areas 32 (for example, display area A, display area B, . . . ) that are divided on the display screen 31.

In addition, the cursor or the operation items can be moved only within a range of the respective associated separate display area 32 with respect to each of the plurality of operation surfaces 22, and different operation ranges 33 on the display screen 31 (for example, operation range a, operation range b, . . . ) are set with respect to each of the plurality of operation surfaces 22.

For example, as shown in FIG. 1, the display screen 31 is disposed at the front side of a driver's seat (not shown), is formed in an approximately rectangular shape of which the longitudinal direction corresponds to a vehicle width direction of the vehicle, and is divided into two display areas 32 (display area A and display area B) by a boundary φ that extends from a center position of the display screen in the direction perpendicular to the longitudinal direction.

Moreover, the operation surfaces 22 of the two touch pads 21 (touch pad Ta and touch pad Tb) are disposed so as to be symmetrical with respect to a center surface perpendicular to the vehicle width direction of the vehicle including the center of the grip portion at predetermined locations that are deviated from the center of the grip portion 16 to the left side and the right side in the vehicle width direction in a neutral state of the steering wheel 15 provided in the vehicle.

Thereby, the two touch pads 21 (touch pad Ta and Tb) include operation surfaces 22 on which the same operator sitting in the driver's seat of the vehicle can simultaneously perform a contact operation using the fingers of both the left and right hands in a state of maintaining a predetermined driving posture and gripping the steering wheel 15.

Figure 3:
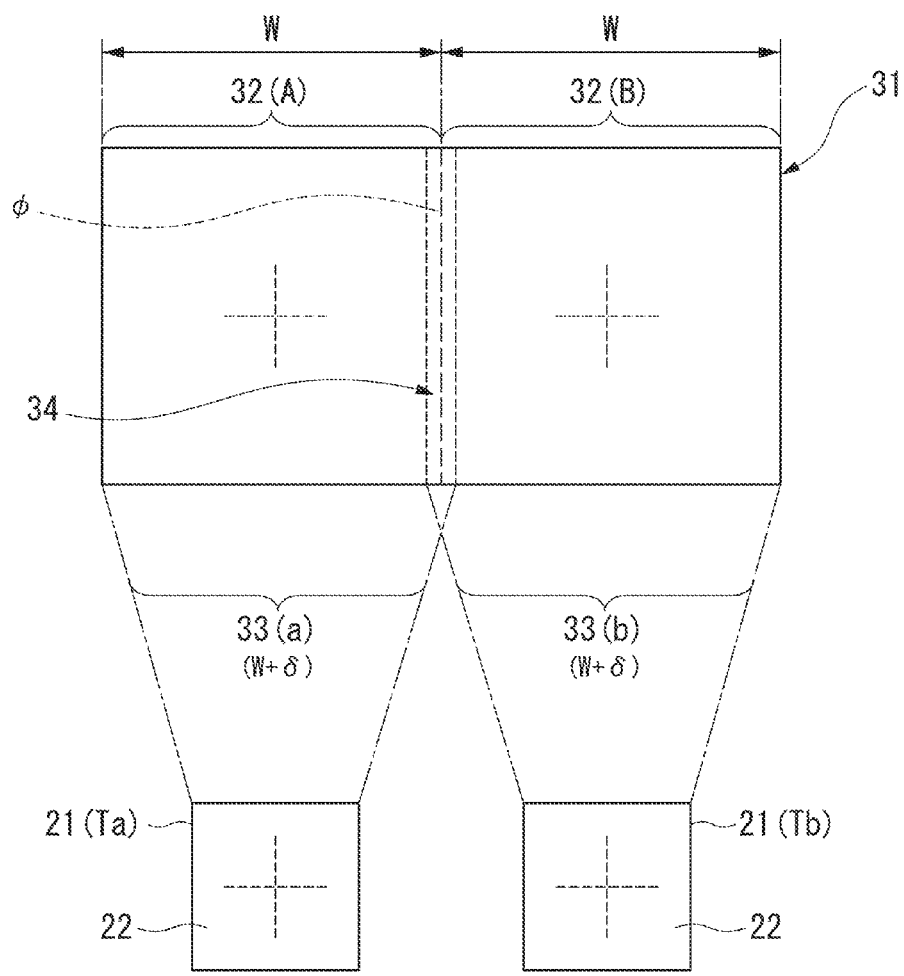
FIG. 3 is a diagram showing an example of a correspondence relationship between a plurality of display areas that are divided on a display screen and separate operation ranges on the display screen that is set with respect to each of the operation surfaces of a plurality of touch pads of the input device in the vehicle input apparatus according to the embodiment of the present invention.

In addition, for example, as shown in FIGS. 1 and 3, in a front view of the display screen 31, the left side display area 32 (display area A) among the two display areas 32 is associated with an operation region 33 (operation range a) that is set with respect to an operation surface 22 of the touch pad 21 (touch pad Ta) that is disposed so as to deviate to the left side in the vehicle width direction from the center of the grip portion 16 in the neutral state of the steering wheel 15.

Moreover, in a front view of the display screen 31, the right side display area 32 (display area B) among the two display areas 32 is associated with an operation region 33 (operation range b) that is set with respect to an operation surface 22 of the touch pad 21 (touch pad Tb) that is disposed so as to deviate to the right side in the vehicle width direction from the center of the grip portion 16 in the neutral state of the steering wheel 15.

The display control portion 13 makes each of the plurality of display areas 32 (for example, display area A, display area B, . . . ) and each of the separate operation ranges 33 (for example, operation range a, operation range b, . . . ) that are set with respect to the plurality of operation surfaces 22 correspond according to an absolute coordinate.

For example, the display control portion 13 stores a predetermined correspondence relationship with respect to a two-dimensional coordinate system (that is, a two-dimensional coordinate system that is set in advance with respect to each of the separate operation ranges 33 that are set with respect to the plurality of operation surfaces 22) that becomes a basis when various contact operations using the fingers of the operator on the operation surface 22 are detected according to each of the plurality of touch pads 21 of the input device 11, and a two-dimensional coordinate system (that is, a two-dimensional coordinate system that is set in advance with respect to each display area 32) that becomes a basis when the movement of the cursor or the operation item is controlled at each of the separate display areas 32 that are associated with the plurality of operation surfaces 22.

Thereby, a position in the operation range 33 that is set with respect to an appropriate operation surface 22 and a position on the display area 32 that is associated with the operation surface 22 correspond in a fixed manner according to an absolute coordinate in which a reference position (for example, an origin or the like) of each coordinate system and a correspondence relationship of coordinate axes are not changed.

In addition, the display control portion 13 is set the operation ranges 33, which are associated with the adjacent display areas 32, to overlap in the vicinity of the boundary of the display areas 32 adjacent with respect to a plurality of display areas 32 (for example, display area A, display area B, . . . ) and the plurality of operation ranges 33 (for example, operation range a, operation b, . . . ).

For example, as shown in FIG. 3, the display control portion 13 sets an overlap range 34 in which the operation ranges 33 (operation range a and operation range b) that are associated with each of the display areas 32 overlap with other in the vicinity of the boundary φ of the adjacent display areas 32 (display area A and display area B).

Thereby, for example, in the display screen 31 that is formed in an approximately rectangular shape of which the longitudinal direction corresponds to the vehicle width direction of the vehicle, each of two operation ranges a and b includes each width (W+δ) which is larger by a predetermined value δ in the longitudinal direction while each of two display areas A and B includes each width W in the longitudinal direction, and the overlap range 34 includes a width 2δ in the longitudinal direction.

Moreover, the display control portion 13 regulates the movable range of the cursor or the operation item on the display screen 31 according to various contact operations using the fingers of the operator on each operation surface 22 within a range of the display area 32 that is associated with each operation surface 22.

Thereby, a position on the operation surface 22, which corresponds to the boundary portion of the operation range 33 that crosses the boundary φ of the display areas 32 adjacent in the overlap range 34 and is positioned in the display area 32 of the mutual opponent side, becomes a so-called dead band. For example, the display control portion 13 controls the display of the cursor or the operation item so as to associate the position on the boundary φ of the display area 32 with respect to the position of the so-called dead band on the operation surface 22.

Moreover, the display control portion 13 displays the cursor on the display screen 31 at all times or when various contact operations (for example, sliding operation, tap operation, gesture operation, or the like) using the fingers of the operator are performed on the operation surface 22 according to signals of the detected results that are output from each of the plurality of touch pads 21 of the input device 11.

In addition, for example, when a sliding operation using the fingers is performed on the operation surface 22, the display control portion 13 moves the cursor by a movement degree according to the operation degree of a sliding operation in a direction according to a sliding operation direction starting from a position on the display screen 31 corresponding to the operation surface 22 in which a sliding operation is performed and the starting position of a sliding operation on the operation surface 22 regardless of the immediately preceding position of the cursor (for example, the final position at which the most recent movement of the cursor is stopped, or the like) on the display screen 31.

Figure 4A:
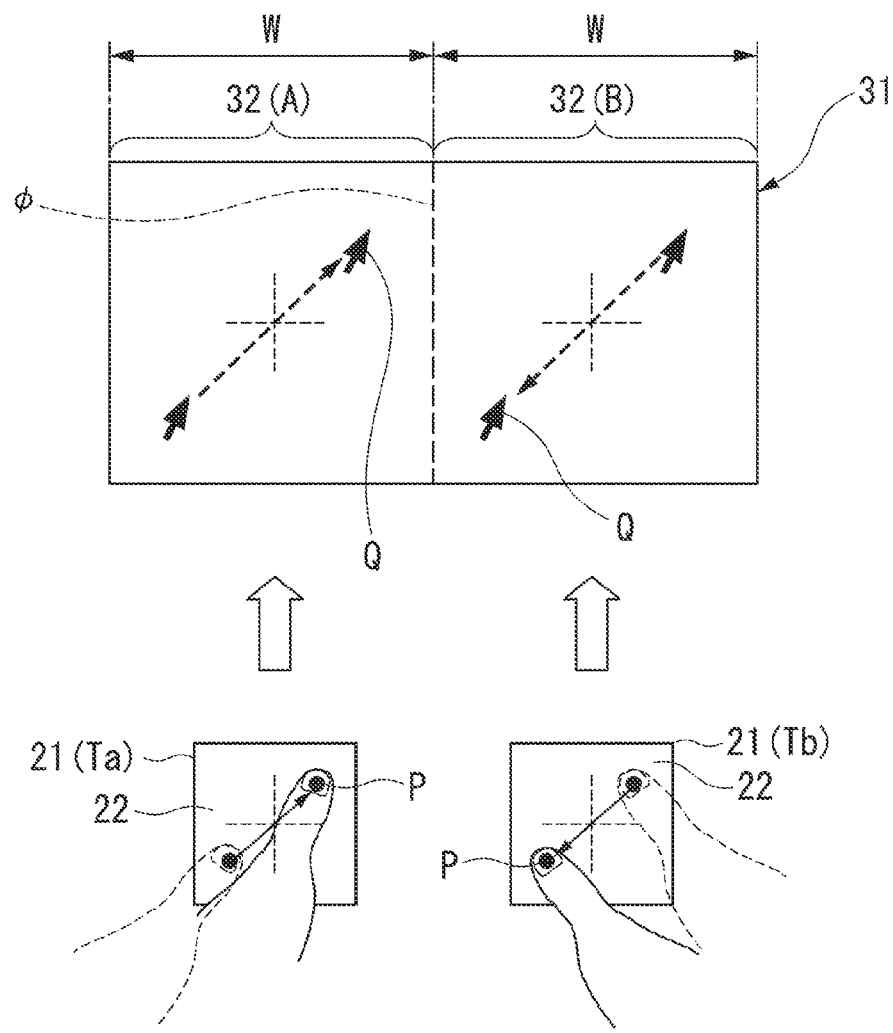
FIG. 4A is a diagram showing an example of the operation surfaces of the touch pads that are associated with each of the plurality of display areas divided on the display screen in the vehicle input apparatus according to the embodiment of the present invention.

For example, in Example shown in FIG. 4A, in the display screen 31 that is formed in an approximately rectangular shape of which the longitudinal direction corresponds to the vehicle width direction of the vehicle, the operation surfaces 22 of the separate touch pad 21 (touch pad Ta and touch pad Tb) are associated with each of two display areas 32 (display area A and display area B) that are divided through the boundary φ according to an absolute coordinate.

In this Example, the display control portion 13 displays a cursor Q at a position on one display area 32 (display area A) that is associated with respect to a contact position P of the finger on the operation surface 22 of one touch pad 21 (touch pad Ta) with a predetermined correspondence relationship.

Moreover, the display control portion 13 displays a cursor Q at a position on the other display area 32 (display area B) that is associated with respect to a contact position P of the finger on the operation surface 22 of the other touch pad 21 (touch pad Tb) with a predetermined correspondence relationship.

Figure 4B:
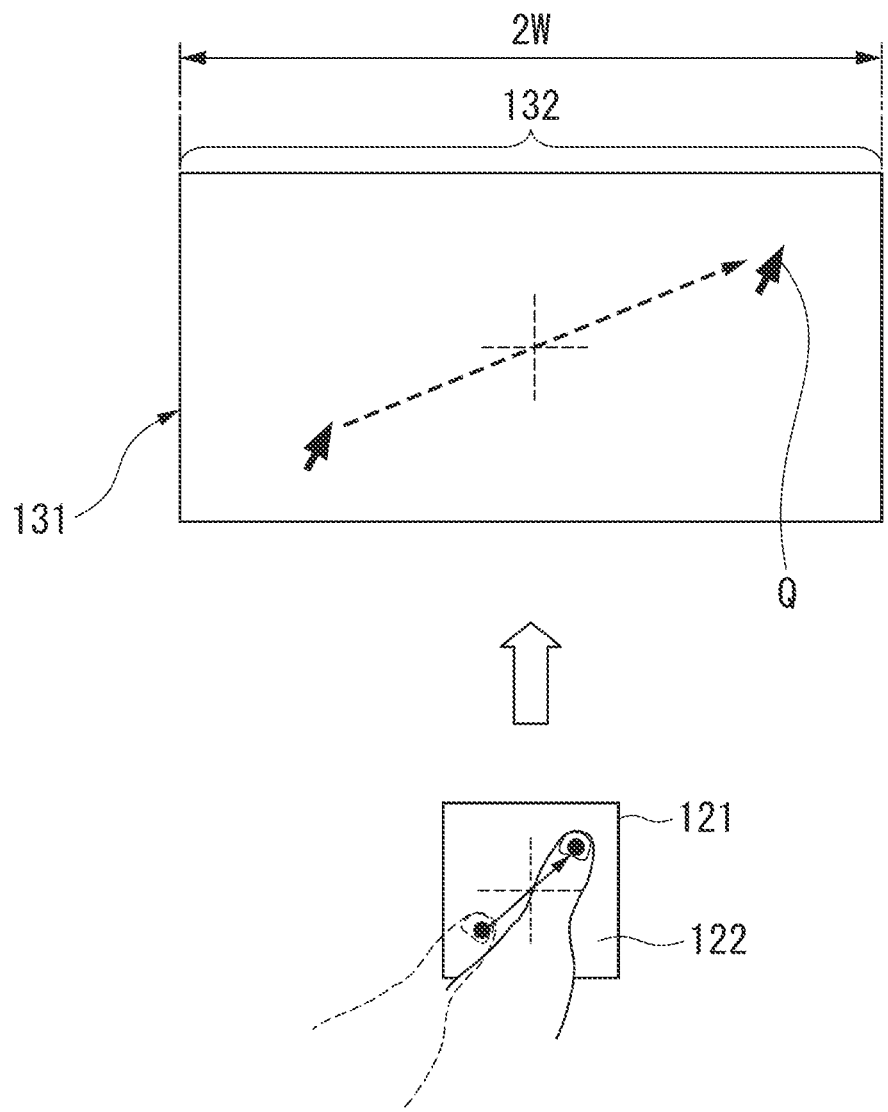
FIG. 4B is a diagram showing an example of an operation surface of a single touch pad that is associated with a display area of a display screen in a Comparative Example.

On the other hand, for example, in Comparative Example shown in FIG. 4B, in a display screen 131 that has the same shape as the display screen 31 of Example shown in FIG. 4A, a single operation surface 122 of the touch pad 121 that has the same shape as each touch pad 21 of Example shown in FIG. 4A is associated with the entire display screen 132 of the display screen 131 according to a relative coordinate.

In Comparative Example, in a case where a cursor Q is displayed on the display screen 131 at all times or when various contact operations (for example, sliding operation or the like) using the fingers of the operator are performed on the operation surface 122, the cursor Q is moved by a movement degree according to the operation degree using the fingers on the operation surface 122 in a direction according to the operation direction using the fingers on the operation surface 122 starting from the immediately preceding position of the cursor Q on the display screen 131 (for example, the final position at which the most recent movement of the cursor Q is stopped, or the like).

That is, in Comparative Example, the position in the operation range that is set with respect to an appropriate operation surface 122 and the position on the display area 132 that is associated with the operation surface 122 variably correspond according to a relative coordinate in which the correspondence relationship of the reference position (for example, an origin or the like) of each coordinate system is changed according to the immediately preceding position of the cursor Q on the display screen 131 or the like.

Thereby, according to Example shown in FIG. 4A, compared to Comparative Example shown in FIG. 4B, it is possible to remove a need to increase a cursor movement degree on the display screen 31 corresponding to the degree of the sliding operation on the operation surface 22 or a need to repeat a sliding operation divided a plurality of times in an objective direction for performing a desired cursor movement instead of increasing the cursor movement degree corresponding to the degree of the sliding operation.

Moreover, when a sliding operation is performed on the operation surface 22, since the Q is moved to a predetermined position on the display screen 31 according to the contact position P of fingers on the operation surface 22 regardless of the immediately preceding position of the cursor (for example, the final position at which the most recent movement of the cursor Q is stopped), intuitive operation by the operator is possible, and operability can be improved.

In addition, depending on an input of characters according to a handwritten input according to a sliding operation using the fingers of the operator on the operation surface 22 of each of the plurality of touch pads 21 of the input device 11, the display control portion 13 displays a character input frame, which causes a predetermined operation object to recognize the handwritten characters input by a sliding operation using the fingers on the operation surface 22, on the display screen 31 as an operation item. In addition, the display control portion 13 displays a pointer, which indicates a portion of the character according to the handwritten input being executed in the character input frame, on the display screen 31 as a cursor.

Moreover, when the display control displays the character input frame on the display screen 31, the display control portion 13 makes the operation range 33 on the display screen 31 that is set with respect to the operation surface 22 correspond to a range of the character input frame.

Figure 5A:
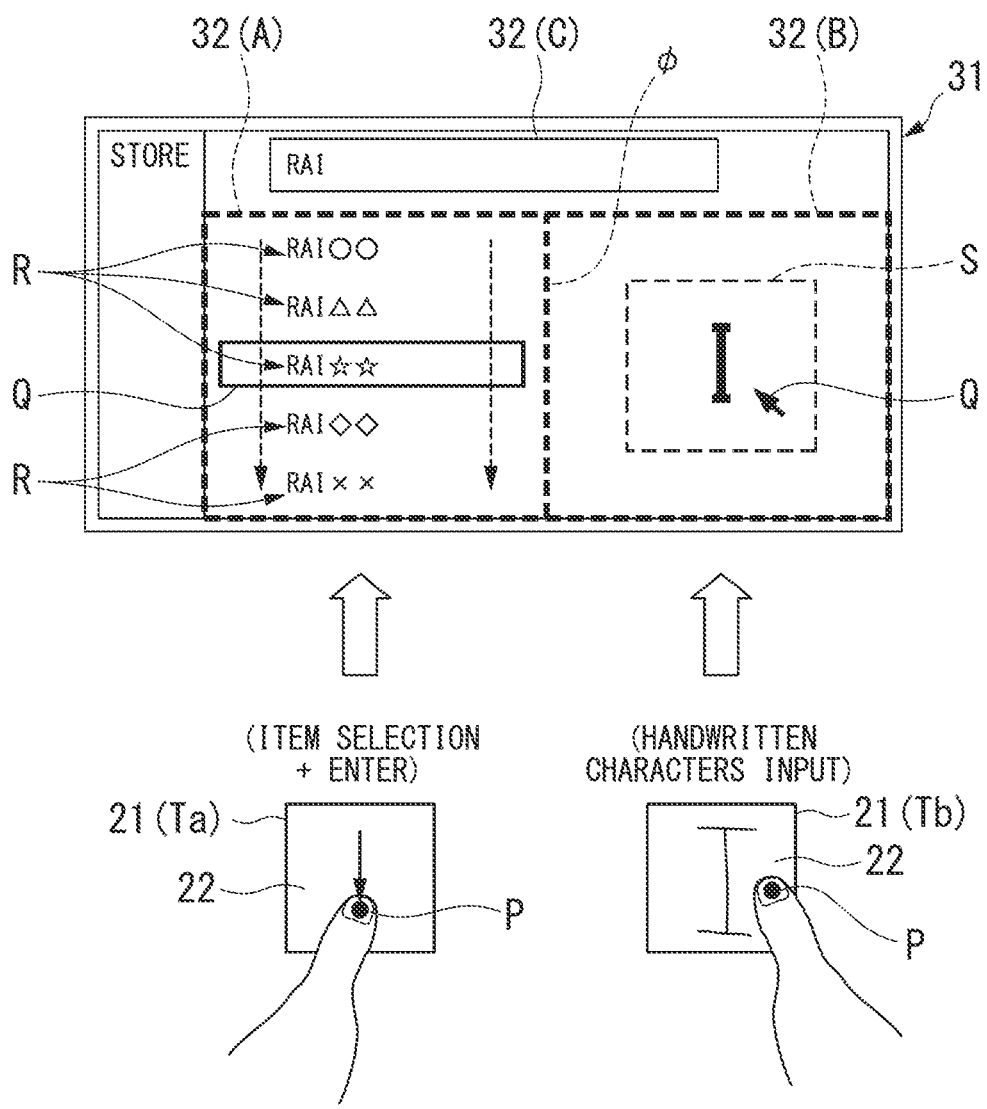
FIG. 5A is a diagram showing a correspondence example between displayed contents on the plurality of display areas that are divided on the display screen and a contact operation using the fingers on the operation surfaces of the touch pads that are associated with each of the plurality of display areas in the vehicle input apparatus according to an Example of the embodiment of the present invention.

For example, in Example shown in FIG. 5A, in a predetermined region of the display screen 31 that is formed in an approximately rectangular shape of which the longitudinal direction corresponds to the vehicle width direction of the vehicle, the operation surfaces 22 of the separate touch pad 21 (touch pad Ta and touch pad Tb) are associated with each of two display areas 32 (display area A and display area B) that are divided through the boundary φ according to an absolute coordinate.

Moreover, the plurality of operation items R and the cursor Q that indicates only one appropriate operation item R from among the plurality of operation items R are displayed on one display area 32 (display area A).

For example, in one display area 32, the position of the cursor Q is fixed, the cursor Q overlaps any one operation item R of the plurality of operation items R according to a sliding operation using the fingers of the operator on one touch pad 21 (touch pad Ta) that is associated with the display area 32, and thereby, the positions of the plurality of operation items R relatively move with respect to the position of the cursor Q.

Moreover, in the other display area 32 (display area B), the character input frame S, the cursor (for example, a cursor that includes a pointer shape, or the like) Q that is moved in the character input frame S, and a trace of the cursor Q in the character input frame S according to traces of a sliding operations of fingers on the operation surface 22 of the other touch pad 21 (touch pad Tb) that is associated with the display area 32 are displayed.

That is, the cursor Q is displayed so to show the portion of the character according to handwritten input in the character input frame according to a sliding operation using the fingers of the operator on the operation surface 22 that is associated with the other display area 32.

Moreover, in the other display area 32, the operation range 33 that is set with respect to the operation surface 22 is set so as to correspond to the range of the character input frame S.

In addition, in the display screen 31 of this Example, in addition to two adjacent display areas 32 (display area A and display area B) that are divided by the boundary φ, the other display area 32 (display area C), which displays a character string according to a series of handwritten inputs according to a sliding operation using the fingers of the operator on the operation surface 22 of the other touch pad 21, is set.

In this Example, first, the display control portion 13 displays the cursor Q at the position in the character input frame S on the other display area 32 (display area B) that is associated with respect to the contact position of the finger on the operation surface 22 of the other touch pad 21 (touch pad Tb) with a predetermined correspondence relationship, and the display control portion displays the trace of the cursor Q according to the trace of a sliding operation of the finger on the operation surface 22 in the character input frame S.

Moreover, at the time of execution of handwritten input, when a predetermined contact operation (for example, tap operation or the like) using the fingers of the operator is performed on the operation surface 22 of the other touch pad 21, the display control portion 13 determines that one input of the character has been completed, and the display control portion adds the character corresponding to the trace of the cursor Q that is displayed in the character input frame S at this time to the displayed contents (that is, character string according to a series of handwritten inputs up to this point in time, or the like) of the display area C.

In addition, the display control portion 13 derives the operation item that includes the character string of the displayed content of the display area C from among the plurality of operation items stored in advance whenever a new character is added to the displayed contents of the display area C, and displays the derived item on one display area 32 (display area A).

In addition, the display control portion 13 relatively moves the positions of the plurality of operation items R with respect to the position of the cursor Q while making the cursor Q fixed onto one display area 32 overlap any one operation item R among the plurality of operation items R according to a sliding operation using the fingers of the operator on the operation surface 22 of one touch pad 21 (touch pad Ta) that is associated with one display area 32.

Moreover, at the relative movement of the plurality of operation items R with respect to the cursor Q, when a predetermined contact operation (for example, tip operation or the like) using the fingers of the operator is performed on the operation surface 22 of one touch pad 21, the display control portion 13 determines that the operation item R on which the cursor Q overlaps at this time is selected and outputs signals of the results to a predetermined operation object (for example, various on-vehicle equipment such as a navigation device, an air conditioner, and an acoustic device that are installed on the vehicle).

Figure 5B:
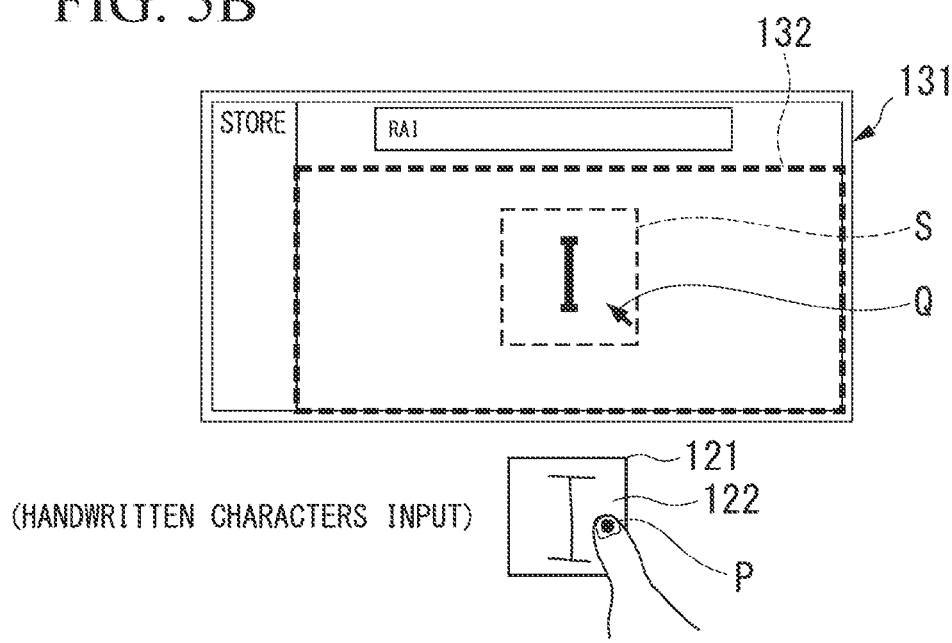
FIG. 5B is a diagram showing a correspondence example between displayed contents on the display area of the display screen and a contact operation using the fingers on the operation surfaces of the single touch pad that is associated with the display area in Comparative Example.
Figure 5C:
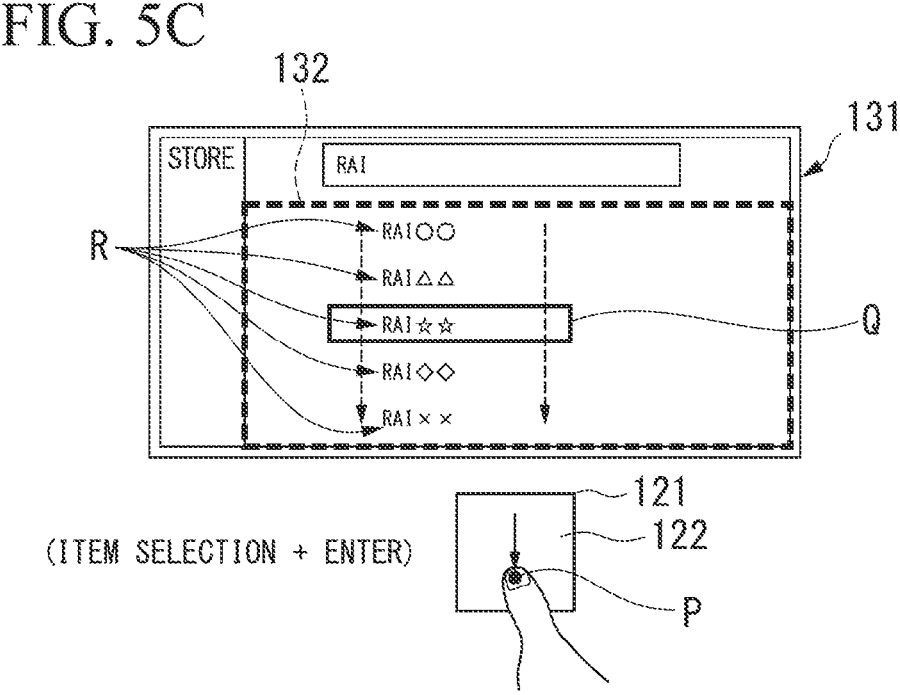
FIG. 5C is a diagram showing a correspondence example between displayed contents on the display area of the display screen and a contact operation using the fingers on the operation surfaces of the single touch pad that is associated with the display area in Comparative Example.

On the other hand, for example, in Comparative Example shown in FIGS. 5B and 5C, in a predetermined region of the display screen 131 that has the same shape as the predetermined region of the display screen 31 of Example shown in FIG. 5A, the operation surface 122 of the single touch pad 121 having the same shape as each touch pad 21 of Example shown in FIG. 5A is associated with the display area 132 corresponding to the entire predetermined region according to the absolute coordinate.

In Comparative Example, for example, an operation mode (an operation mode of the handwritten character input) that displays the character according to handwritten input according to a sliding operation using the fingers of the operator on the operation surface 122 of the touch pad 121 shown in FIG. 5B in the character input frame S on the display area 132, and for example, an operation mode (operation mode of item selection+enter) that selects any one operation item R from among the plurality of operation items R including the character string according to a series of handwritten inputs shown in FIG. 5C and determines the selection are switched by a predetermined contact operation (for example, tap operation or the like) using the fingers of the operator on the operation surface 122 of the touch pad 121.

That is, for example, in the operation mode of the handwritten character input shown in FIG. 5B, in the display area 132, the character input frame S, the cursor Q that displays the portion of the character according to handwritten input according to a sliding operation using the fingers of the operator on the operation surface 122 of the touch pad 121 that is associated with the display area 132 and moves in the character input frame S, and the trace of the cursor Q in the character input frame S according to the trace of a sliding operation of the finger on the operation surface 122 are displayed.

Moreover, for example, in the operation mode of the item selection+enter shown in FIG. 5C, in the display area 132, the plurality of operation items R and the cursor Q that indicates only one appropriate operation item R from among the plurality of operation items R are displayed.

Moreover, for example, in the display area 132, the position of the cursor Q is fixed, the cursor Q overlaps any one operation item R of the plurality of operation items R according to a sliding operation using the fingers of the operator on the operation surface 122 of the touch pad 121 that is associated with the display area 132, and thereby, the positions of the plurality of operation items R relatively move with respect to the position of the cursor Q.

Therefore, according to Example shown in FIG. 5A, compared to Comparative Example shown in FIGS. 5B and 5C, a need to switch the operation mode can be removed, and ease of operation can be improved.

Figure 6A:
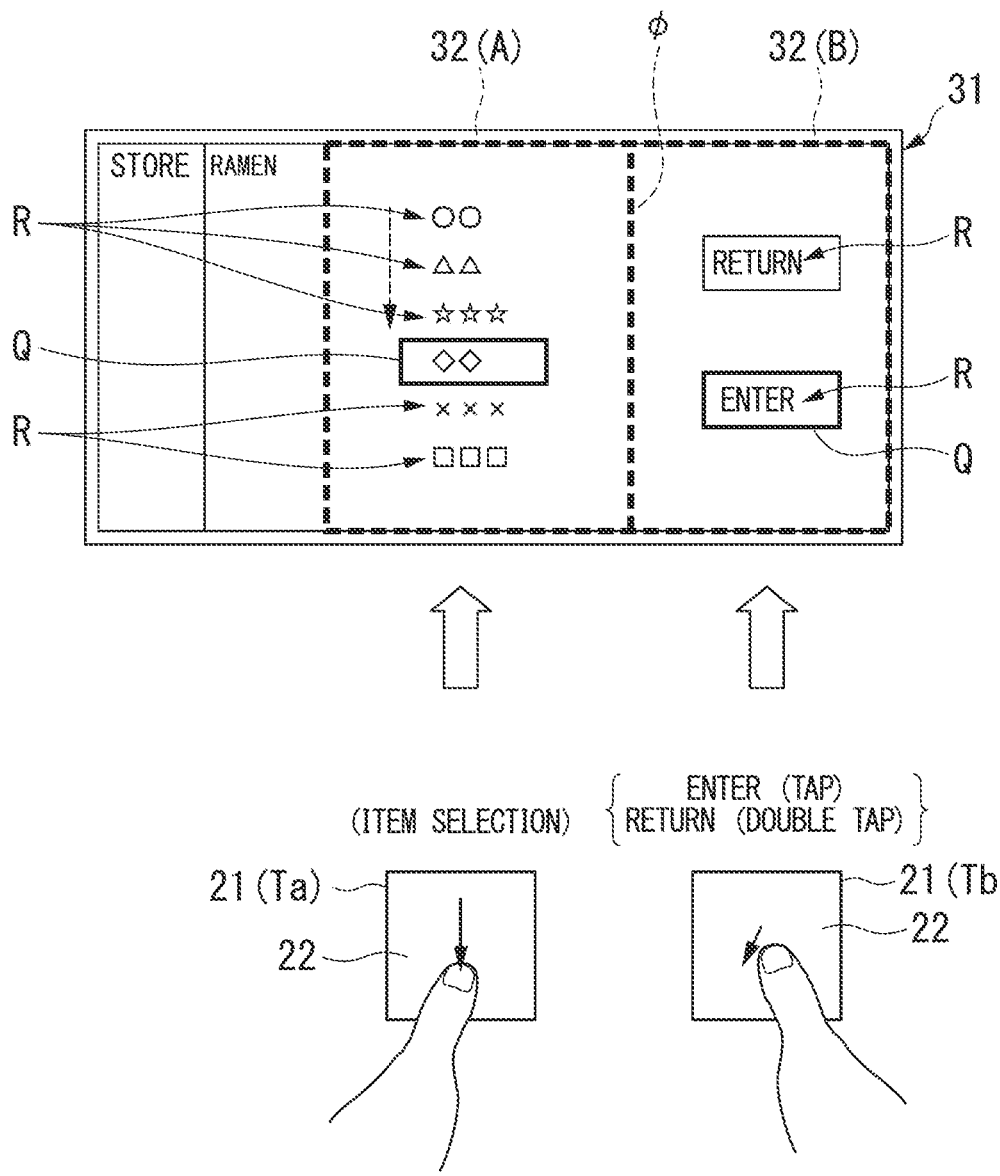
FIG. 6A is a diagram showing a correspondence example between displayed contents on the plurality of display areas that are divided on the display screen and a contact operation using the fingers on the operation surfaces of the touch pads that are associated with each of the plurality of display areas in the vehicle input apparatus according to Example of the embodiment of the present invention.

In addition, for example, in Example shown in FIG. 6A, in a predetermined region of the display screen 31 that is formed in an approximately rectangular shape of which the longitudinal direction corresponds to the vehicle width direction of the vehicle, the operation surfaces 22 of the separate touch pad 21 (touch pad Ta and touch pad Tb) are associated with each of two display areas 32 (display area A and display area B) that are divided through the boundary φ according to an absolute coordinate.

Moreover, the plurality of operation items R and the cursor Q that indicates only one appropriate operation item R from among the plurality of operation items R are displayed on one display area 32 (display area A).

In one display area 32, the cursor Q overlaps any one operation item R of the plurality of operation items R according to a gesture operation (for example, sweep operation) using the fingers of the operator on the operation surface 22 of one touch pad 21 (touch pad Ta) that is associated with the display area 32, and thereby, the position of the cursor Q relatively moves with respect to the positions of the plurality of operation items R.

Moreover, in the other display area 32 (display area B), two operation items R and the cursor Q that indicates any one of two operation items R are displayed.

In the other display area 32, the cursor Q overlaps with any one of two operation items R according to a predetermined contact operation (for example, tap operations in which the operation frequencies are different from one another, or the like) using the fingers of the operator on the operation surface 22 of the other touch pad 21 (touch pad Tb) that is associated with the display area 32, and thereby, the position of the cursor Q relatively moves with respect to the positions of two operation items R.

In addition, for example, two operation items R in the other display area 32 are an operation item R ("return") that indicates the display of the plurality of operation items R sequentially switched in one display area 32 returning to the last display and an operation item R ("enter") that indicates the determination of the selection with respect to any one operation item R in which the cursor Q overlaps and selects from the plurality of operation items R in one display area 32.

In Example, first, the display control portion 13 relatively moves the position of the cursor Q with respect to the positions of the plurality of operation items R while making the cursor Q overlap any one operation item R from the plurality of operation items R displayed on the display area 32 according to a gesture operation using the fingers of the operator on the operation surface 22 of one touch pad 21 (touch pad Ta) that is associated with one display area 32.

In addition, the cursor Q overlaps any one operation item R from the plurality of operation items R in one display area 32, in a state where the operation item R is selected, the cursor Q overlaps with the operation item R ("enter") that indicates the determination of the selection in two operation items R in other display area 32 according to a predetermined contact operation (for example, tap operation in which the operation frequency is one-time, or the like) using the fingers of the operator on the other touch pad 21 (touch pad Tb) associated with the other display area 32, and thereby, if the operation item R is selected, the display control portion 13 determines that the operation item R on one display area 32 is selected, and the display control portion 13 outputs signals of the results to a predetermined operation object (for example, various on-vehicle equipment such as a navigation device, an air conditioner, and an acoustic device that are installed on the vehicle).

Moreover, in the state where the plurality of operation items R are displayed on one display area 32, the cursor Q overlaps with the operation item R ("return") that indicates the operation item returning the last display in two operation items R in other display area 32 according to a predetermined contact operation (for example, tap operation in which the operation frequency is two-time, or the like) using the fingers of the operator on the other touch pad 21, and thereby, if the operation item R is selected, the display control portion 13 returns the display of the plurality of operation items R that are sequentially switched in one display area 32 to the last display.

In addition, in the state where the plurality of operation items R are displayed on one display area 32, the display control portion 13 may make the cursor Q overlap any one operation item R from two operation items R in other display area 32 according to a predetermined contact operation (for example, sweep operation) using the fingers of the operator on the other touch pad 21, and determine that the operation item R where the cursor Q overlaps has been selected according to a predetermined contact operation (for example, tap operation in which the operation frequency is one-time, or the like) using the fingers of the operator on the other touch pad 21.

Figure 6B:
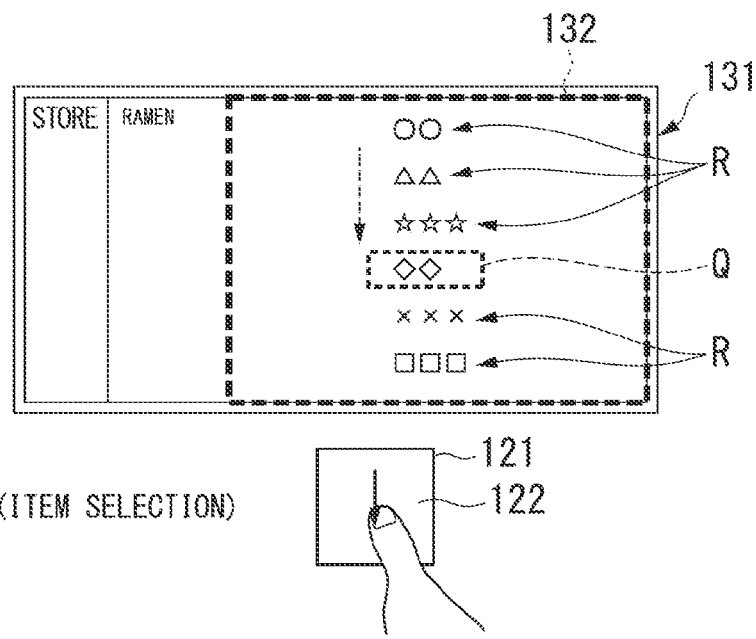
FIG. 6B is a diagram showing a correspondence example between displayed contents on the display area of the display screen and a contact operation using the fingers on the operation surface of the single touch pad that is associated with the display area in Comparative Example.
Figure 6C:
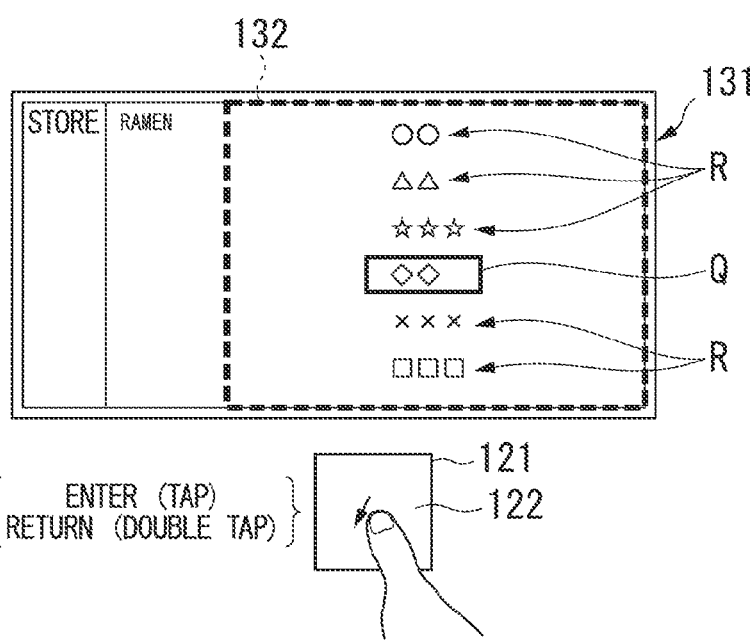
FIG. 6C is a diagram showing a correspondence example between displayed contents on the display area of the display screen and a contact operation using the fingers on the operation surface of the single touch pad that is associated with the display area in Comparative Example.

On the other hand, for example, in Comparative Example shown in FIGS. 6B and 6C, in a predetermined region of the display screen 131 that has the same shape as the predetermined region of the display screen 31 of Example shown in FIG. 6A, the operation surface 122 of the single touch pad 121 having the same shape as each touch pad 21 of Example shown in FIG. 6A is associated with the display area 132 corresponding to the entire predetermined region according to the absolute coordinate.

In Comparative Example, for example, an operation mode (an operation mode of an item selection) that selects any one operation item R from among the plurality of operation items R according to the gesture operation using the fingers of the operator on the operation surface 122 of the touch pad 121 shown in FIG. 6B, and for example, an operation mode (enter or return operation mode) that returns the display of the plurality of operation items R sequentially switched in the display screen 131 to the last display according to a predetermined contact operation (for example, tap operation in which operation frequency is different, or the like) using the fingers of the operator on the operation surface 122 of the touch pad 121 shown in FIG. 6C or determines the selection with respect to any one operation item R that is selected by making the cursor Q overlap any one among the plurality of operation items R are switched by a predetermined contact operation using the fingers of the operator on the operation surface 122 of the touch pad 121.

That is, for example, in the operation mode of the item selection shown in FIG. 6B, the plurality of operation items R and the cursor Q that indicates only one appropriate operation item R from among the plurality of operation items R are displayed.

Moreover, in the display area 132, the cursor Q overlaps any one operation item R of the plurality of operation items R according to a gesture operation (for example, sweep operation, or the like) using the fingers of the operator on the operation surface 122 of the touch pad 121 that is associated with the display area 132, and thereby, the position of the cursor Q relatively moves with respect to the positions of the plurality of operation items R.

In addition, for example, in the enter or return operation mode shown in FIG. 6C, the display of the plurality of operation items R is returned to the last display in the display area 132 according to a predetermined contact operation (for example, a tap operation in which the operation frequency is different, or the like) using the fingers of the operator on the operation surface 122 of the touch pad 121 that is associated with the display area 132, or a display shape of the cursor Q that overlaps any one operation items R from the plurality of operation item R in the display area 132 is changed (for example, the boundary line is changed from a broken line to a solid line, or the like).

Therefore, according to Example shown in FIG. 6A, compared to Comparative Example shown in FIG. 6B, the plurality of different operations (for example, the operation that selects one appropriate operation item R, the operation that determines the selection, or the like) can be more rapidly and continuously performed through the plurality of different touch pads 21, and quick operation is possible and operation efficiency can be improved.

In addition, in order to determine the selection of any one operation item R from the plurality of operation items R in one display area 32, since a predetermined contact operation using the fingers on the operation surfaces 22 of the two touch pads 21 (touch pad Ta and touch Tb) is required, it is possible to prevent the selection of unintentional operation items R of the operator from being erroneously determined, and occurrence of an erroneous operation can be prevented.

As described above, according to the input apparatus 10 for the vehicle of the present embodiment, since different display areas 32 are divided on the display screen 31 with respect to each of the plurality of operation surfaces 22 of the plurality of touch pads 21 and the cursor can be moved only within the range of each display area 32, for example, it is not necessary to correspond only one operation surface 22 to the entire display screen 31.

Thereby, even when the operation surface 22 is disposed at a place in which sufficiently securing the area of the operation surface 22 is difficult, compared to a case where the area of the operation surface 22 can be sufficiently secured, it is possible to remove a need to increase a cursor movement degree on the display screen 31 corresponding to the degree of the sliding operation on the operation surface 22, and operation accuracy can be improved.

In addition, it is possible to remove a need to repeat a sliding operation divided a plurality of times in an objective direction for performing a desired cursor movement instead of increasing the cursor movement degree corresponding to the degree of the sliding operation.

Thereby, both miniaturization of each operation surface 22 and improved ease of operation can be secured.

In addition, in the condition in which the correspondence between the contact position of the fingers on the operation surface 22 and the position of the cursor on the display screen 31 is absolute (that is, the correspondence relationship of the reference position such as an origin is not changed), since the operation ranges 33 that are associated with the adjacent display areas 32 overlap, even when the cursor is moved at the vicinity of the boundary of the display area 32, it is possible to remove a need to perform a sliding operation using the fingers in ends of the operation surface 22, and improved ease of operation can be secured.

Moreover, since the display area 32 and the operation range 33 of the operation surface 22 that is associated with the display area 32 overlap, when a sliding operation using the fingers is performed on the operation surface 22, the cursor is moved to a predetermined position on the display screen 31 according to the contact position of the fingers on the operation surface 22 regardless of the immediately preceding position of the cursor (for example, the final position at which the most recent movement of the cursor is stopped, or the like).

Thereby, intuitive operation by the operator is possible, and operability can be improved.

Figure 7A:
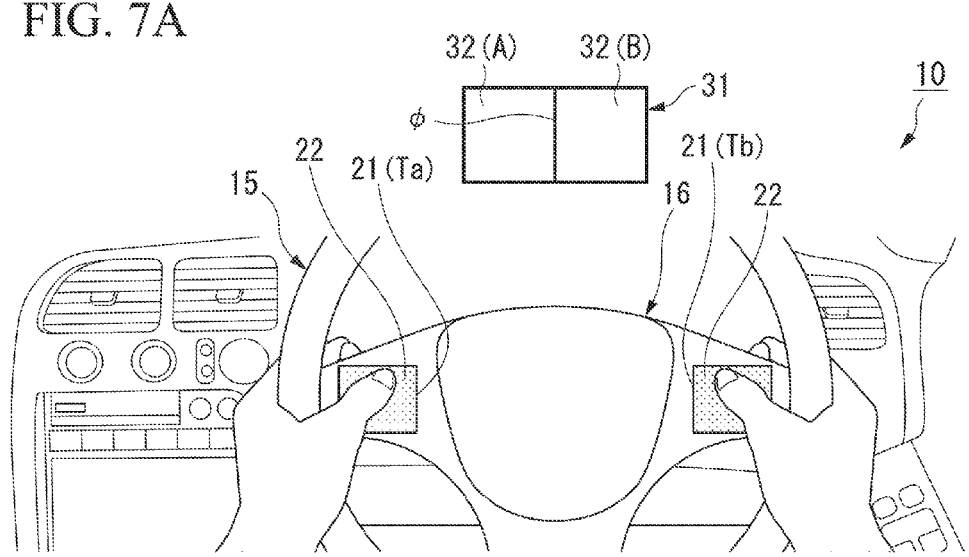
FIG. 7A is a diagram showing an example of the operation surfaces of the touch pads that are associated with each of the plurality of display areas divided on the display screen in the vehicle input apparatus according to Example of the embodiment of the present invention.
Figure 7B:
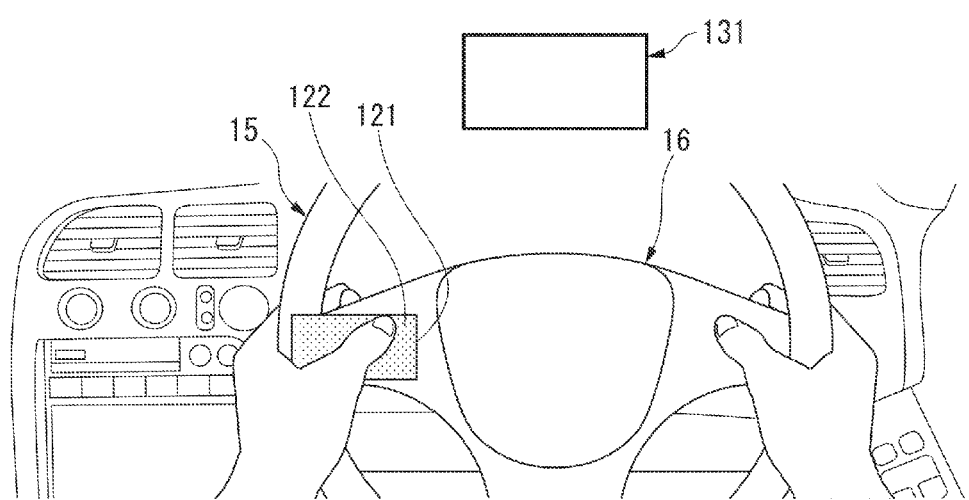
FIG. 7B is a diagram showing an example of a display screen and an operation surface of a single touch pad that is associated with the display screen in Comparative Example.

Moreover, with respect to the display screen 31 having a predetermined shape (for example, an approximately rectangular shape of which the longitudinal direction corresponds to the vehicle width direction of the vehicle, or the like), for example, as Example shown in FIG. 7A, since the operation surfaces 22 of the separate touch pad 21 (touch pad Ta and touch pad Tb) having a shape corresponding to the shape of each of the plurality of (for example, two) display areas 32 (display area A and display area B) obtained by dividing the display screen 31 are provided, for example, compared to a case where the operation surface 122 of the single touch pad 121 is associated with the entire region of the display screen 131 having the same shape as the display screen 31 having a predetermined shape as Comparative Example shown in FIG. 7B, the size of each touch pad 21 can be decreased.

That is, for example, in the Comparative Example shown in FIG. 7B, according to the fact that the operation surface 122 of the touch pad 121 has an approximately rectangular shape, of which the longitudinal direction corresponds to the vehicle width direction, corresponding to the shape of the display screen 131 that is formed in an approximately rectangular shape of which the longitudinal direction corresponds to the vehicle width direction of the vehicle, in order to make the fingers contact the position of the center side of the steering wheel 15 on the operation surface 122, for example, the gripping state of the steering wheel 15 is required to be changed, and for example, there is a concern that it may be necessary to stretch the fingers out forcibly.

In order to solve such a problem, for example, according to Example shown in FIG. 7A, the size of each touch pad 21 can be decreased, even when hands of the operator are small, easy contact operations using the fingers with respect to the entire area of each touch pad 21 can be performed in a state where the steering wheel 15 is gripped, and operability can be improved.

Moreover, in a front view of the display screen 31, the left and right display areas 32 (display area A and display area B) are set so as to correspond to the operation ranges 33 (operation range a and operation range b) that are set with respect to the operation surfaces 22 of the left side and right side of touch pads 21 (touch pad Ta and touch pad Tb) of the steering wheel 15.

Thereby, intuitive operation by the operator is possible while securing versatility of the layout of the plurality of operation surfaces 22 and the separate display areas 32 that are associated with each of the plurality of operation surfaces 22, and operability can be improved.

Moreover, since the layouts of the left side touch pad 21 and the right side touch pad 21 (touch pad Ta and touch pad Tb) of the steering wheel 15 are the same as each other (that is, is symmetrical with respect to the center surface perpendicular to the vehicle width direction of the vehicle that includes the center of the grip portion 16), an operation through a dominant hand (or a preferable hand of the left and right hands) of the operator can be easily performed.

Figure 8:
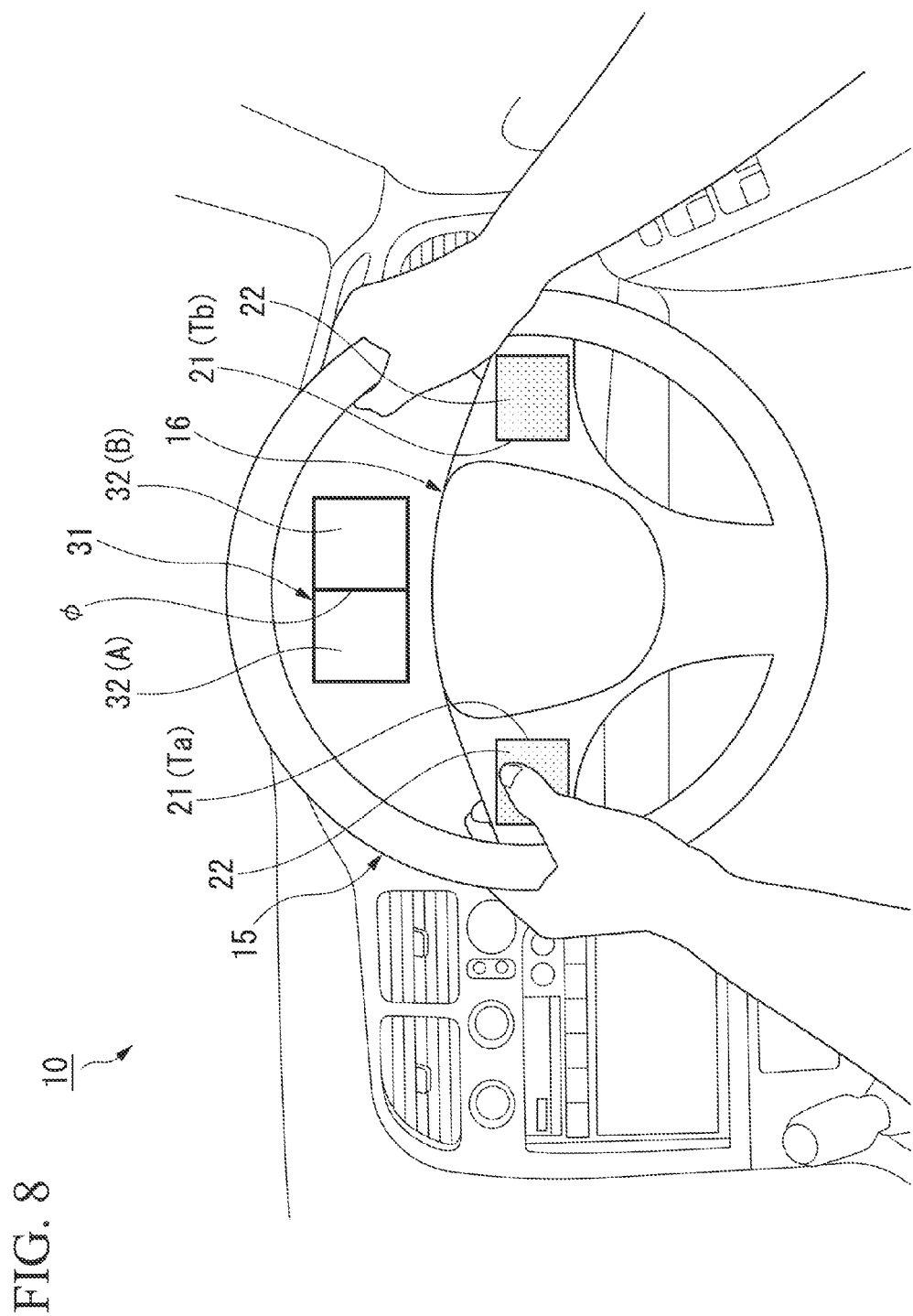
FIG. 8 is a diagram showing an example of the operation surfaces of the touch pads that are associated with each of the plurality of display areas divided on the display screen in the vehicle input apparatus according to the embodiment of the present invention.

Moreover, in this case, for example, as shown in FIG. 8, various contact operations using the fingers on the operation surface 22 of the touch pad 21 by one hand can be easily performed while strongly gripping the steering wheel 15 by the other hand, and operability can be improved.

In addition, since the layouts of the plurality of touch pads 21 are the same so as to be symmetrical in the left and right regardless of the position of the steering wheel 15 inside a vehicle (a so-called right steering wheel and left steering wheel), it is possible to prevent costs required for the configuration from increasing.

In addition, with respect to the input of the character according to handwritten input, since the operation range 33 set with respect to the operation surface 22 and the range of the character input frame correspond, space of the character input on the operation surface 22 can be secured in the maximum regardless of the division of the display screen 31, accuracy at the time of inputting the character can be improved, and operability can be improved.

Figure 9A:
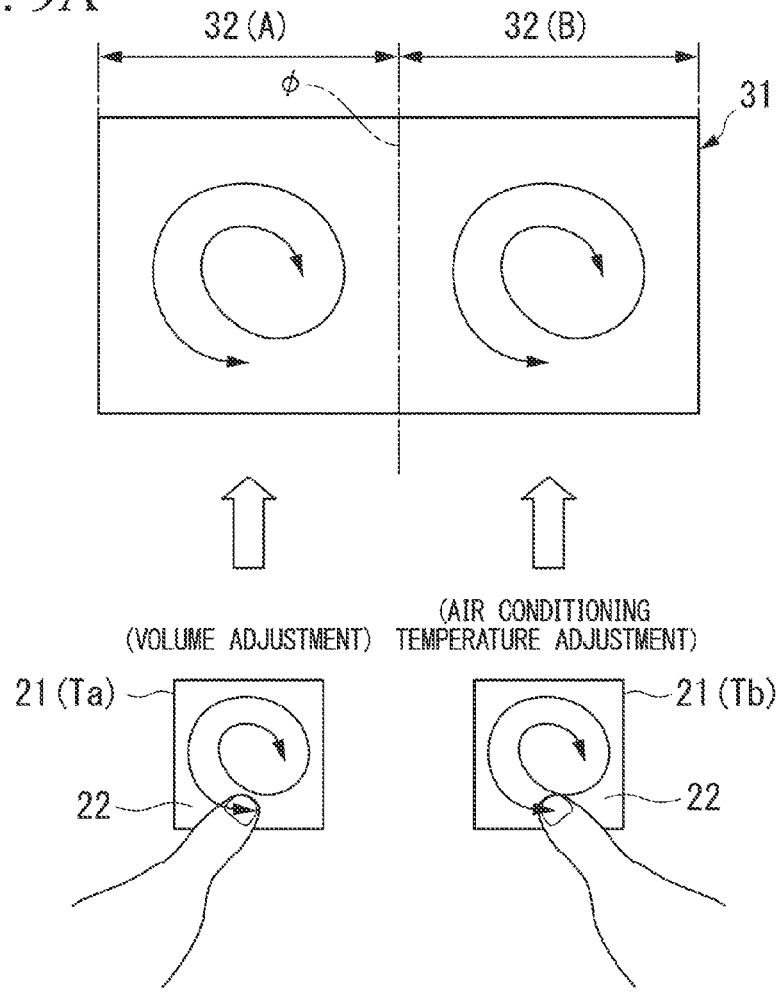
FIG. 9A is a diagram showing a correspondence example between displayed contents on the plurality of display areas that are divided on the display screen and a contact operation using the fingers on the operation surfaces of the touch pads that are associated with each of the plurality of display areas in a vehicle input apparatus according to a first modification of the embodiment of the present invention.
Figure 9B:
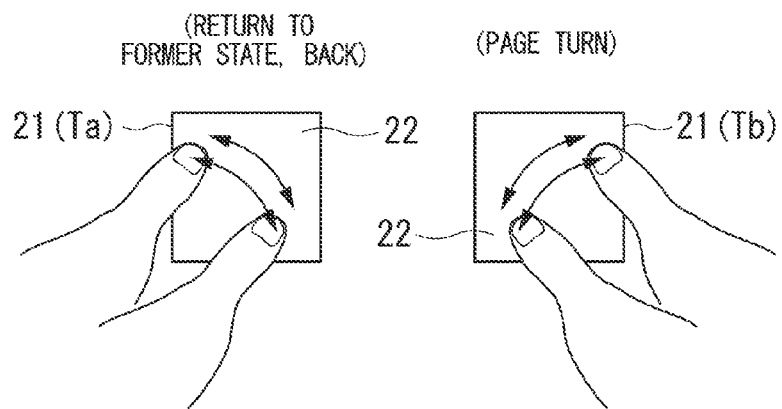
FIG. 9B is a diagram showing another example of the contact operation using the fingers on the operation surfaces of the plurality of touch pads.

Moreover, for example, in the above-described embodiment, as a first modification shown in FIGS. 9A and 9B, execution of the same contact operations using the fingers of the operator is effective with respect to the operation surfaces 22 of the separate touch pad 21 (touch pad Ta and touch pad Tb) that are associated with each of the plurality of (for example, two) display areas 32 (display area A and display area B) that are divided by the boundary φ in the display screen 31, and separate operation contents may be associated with respect to the same contact operation on each operation surface 22.

For example, with respect to the operation surfaces 22 of the two touch pads 21 (touch pad Ta and touch pad Tb) shown in FIG. 9A, execution of a rotation gesture operation in which the fingers are rotated so as to draw a circle on the operation surfaces 22 is effective as the same contact operation.

In addition, an operation content of volume adjustment of an acoustic device or the like is associated with respect to the rotation gesture operation on one operation surface 22, and an operation content of air conditioning temperature adjustment of an air conditioner is associated with respect to the rotation gesture operation on the other operation surface 22.

Moreover, for example, with respect to the operation surfaces 22 of the two touch pads 21 (touch pad Ta and touch pad Tb) shown in FIG. 9B, execution of twice tap operations on the operation surfaces 22 is effective as the same contact operation to one another.

Moreover, an operation content ("return to a former state, BACK") in which the display at the display area 32 (display area A) associated with the operation surface 22 is returned to the last display or the preceding item display is associated with respect to the twice tap operations on one operation surface 22, and an operation content ("page turn") in which the display at the display area 32 (display area B) associated with the operation surface 22 advances to the following item display is associated with respect to the twice tap operations on the other operation surface 22.

According to the first modification, according to the common contact operation that is effective on the plurality of operation surfaces 22, the plurality of separate operations can be executed according to the number of the plurality of operation surfaces 22.

Thereby, for example, the plurality of separate contact operations are not needed in order to execute the plurality of separate different operations, and a burden of the operator who memorizes the plurality of separate contact operations can be prevented.

In addition, since the plurality of separate operation contents are associated to be shared with the plurality of operation surfaces 22 in which the common contact operation is executed, operation efficiency can be improved.

Figure 10A:
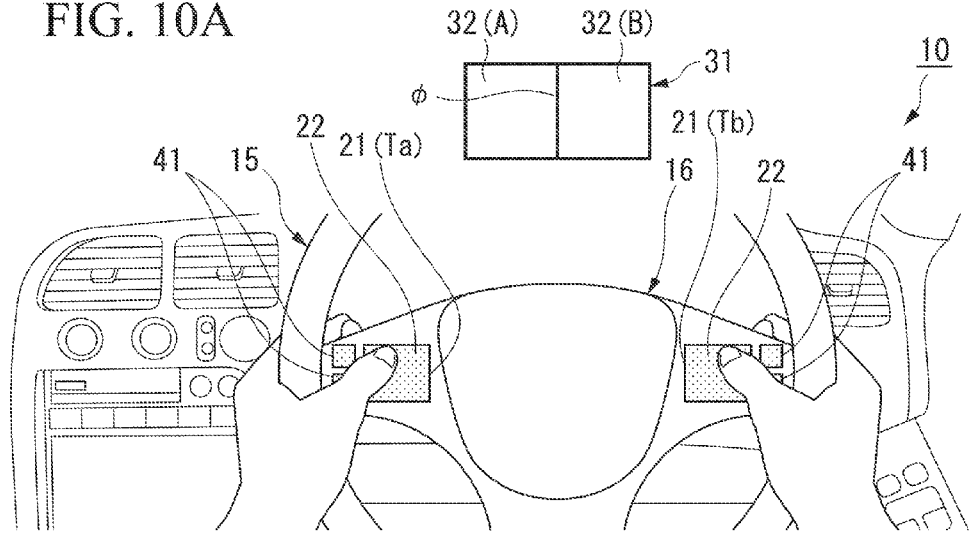
FIG. 10A is a diagram showing an example of a disposition relationship between the operation surfaces of the touch pads that are associated with each of the plurality of display areas that are divided on the display screen and a plurality of switches in a vehicle input apparatus according to a second modification of the embodiment of the present invention.

Moreover, for example, in the above-described embodiment, as a second embodiment shown in FIG. 10A, another input device 11 (for example, a plurality of switches 41 or the like) may be disposed in the vicinity of each touch pad 21.

For example, in Example of a second modification shown in FIG. 10A, the operation surfaces 22 of the separate touch pads 21 (touch pad Ta and touch pad Tb), which are associated with each of the plurality of (for example, two) display areas 32 (display area A and display area B) divided by the boundary $\phi$ in the display screen 31, are disposed at positions which are deviated in the left side and the right side of the vehicle width direction from the center of the grip portion 16 in a neutral state of the steering wheel 15.

Moreover, the plurality of (for example, two) switches 41 are disposed at positions which are deviated in the left side and the right side in the vehicle width direction from each operation surface 22 on the grip portion 16 respectively.

Figure 10B:
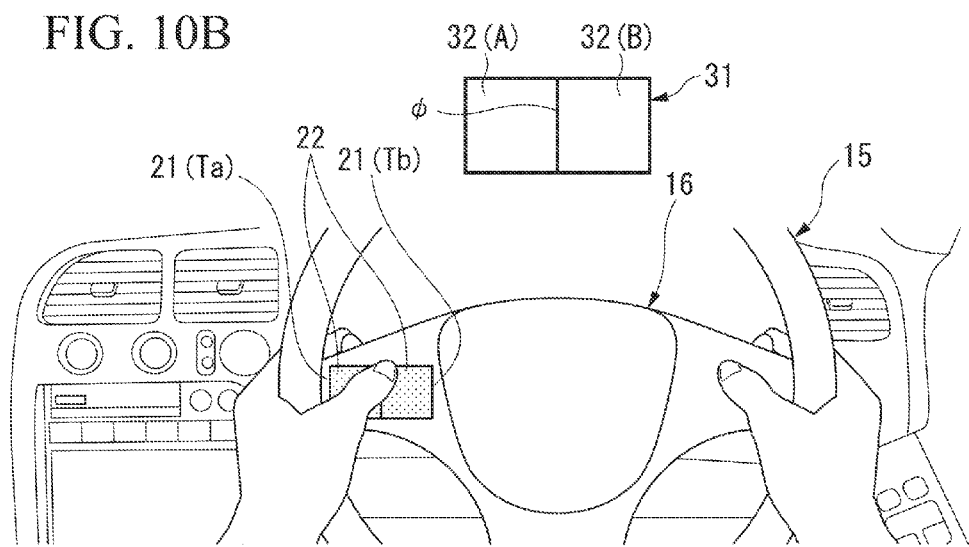
FIG. 10B is a diagram showing a disposition example of the operation surfaces of the touch pads that are associated with each of the plurality of display areas that are divided on the display screen in Comparative Example.

On the other hand, for example, in Comparative Example shown in FIG. 10B, the operation surfaces 22 of the separate touch pads 21 (touch pad Ta and touch pad Tb), which are associated with each of the plurality of (for example, two) display areas 32 (display area A and display area B) divided by the boundary $\phi$ in the display screen 31, are disposed at positions which are deviated in one side (for example, left side) of the vehicle width direction from the center of the grip portion 16 in a neutral state of the steering wheel 15.

Thereby, in Comparative Example shown in FIG. 10B, there is a problem in that it is difficult to secure a sufficient size of region for disposing the switches 41 which have easy operability using the fingers in the vicinity of two operation surfaces 22 in a state where the steering wheel 15 is gripped.

In order to solve such a problem, for example, according to Example of the second embodiment shown in FIG. 10A, the operation surfaces 22 of the two touch pads 21 (touch pad Ta and touch pad Tb) are disposed so as to be divided left and right on the grip portion 16 in a neutral state of the steering wheel 15.

Thereby, a sufficient size of region for disposing the plurality of switches 41, which have easy operability using the fingers in the vicinity of each of the operation surfaces 22 in the state where the steering wheel 15 is gripped, can be secured, and diversity of the input operation can be improved.

In addition, in the above-described embodiment, for example, as a third to seventh modifications shown in FIGS. 11A to 11E, the operation surfaces 22 of the separate touch pads 21 (touch pad Ta and touch pad Tb), which are associated with each of the plurality of (for example, two) display areas 32 (display area A and display area B) divided by the boundary $\phi$ in the display screen 31, may be disposed at the steering wheel 15 or other locations in the vicinity of the steering wheel 15.

Figure 11A:
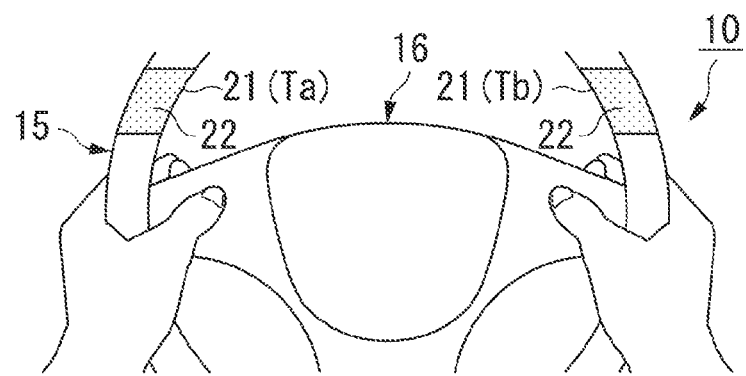
FIG. 11A is diagrams showing disposition examples of the operation surfaces of a plurality of touch pads in a vehicle input apparatus according to a third modification of the embodiment of the present invention.

For example, in the third modification shown in FIG. 11A, the operation surfaces 22 of the two touch pads 21 (touch pad Ta and touch pad Tb) are disposed so as to be symmetrical with respect to the center surface perpendicular to the vehicle width direction of the vehicle including the center of the steering wheel 15 at predetermined positions of the left side and right side on the steering wheel 15.

Figure 11B:
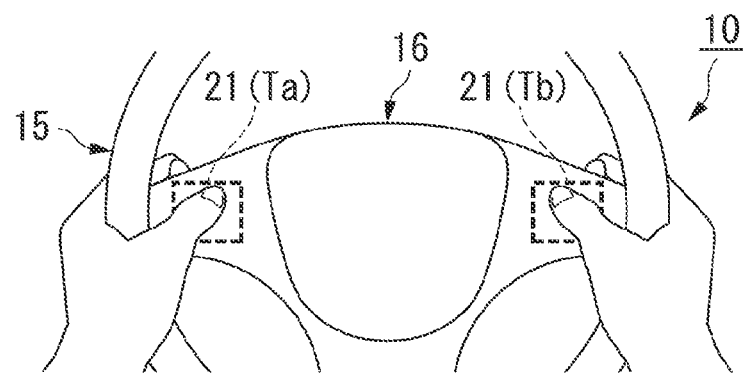
FIG. 11B is diagrams showing disposition examples of the operation surfaces of a plurality of touch pads in a vehicle input apparatus according to a fourth modification of the embodiment of the present invention.

Moreover, for example, in the fourth modification shown in FIG. 11B, the operation surfaces 22 of the two touch pads 21 (touch pad Ta and touch pad Tb) are disposed so as to be symmetrical with respect to the center surface perpendicular to the vehicle width direction of the vehicle including the center of the steering wheel 15 at positions which are deviated in the left side and right side of the vehicle width direction from the center on the rear surface of the grip portion 16 in the neutral state of the steering wheel 15.

Figure 11C:
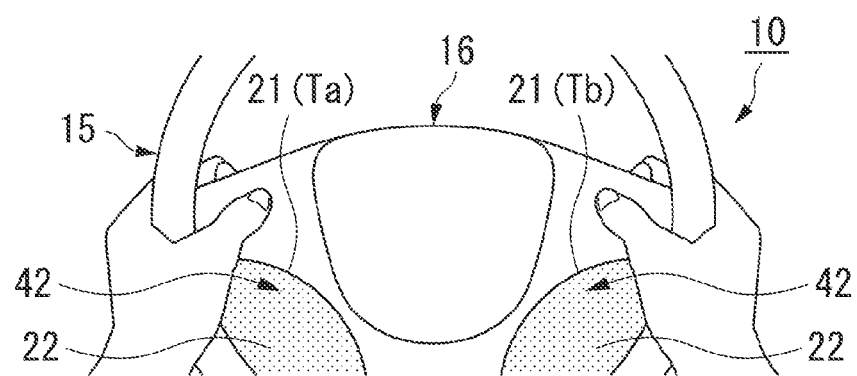
FIG. 11C is diagrams showing disposition examples of the operation surfaces of a plurality of touch pads in a vehicle input apparatus according to a fifth modification of the embodiment of the present invention.

In addition, for example, in the fifth modification shown in FIG. 11C, the operation surfaces 22 of the two touch pads 21 (touch pad Ta and touch pad Tb) are disposed so as to be symmetrical with respect to the center surface perpendicular to the vehicle width direction of the vehicle including the center of the steering wheel 15 in space portions 42 of the left side and right side of the steering wheel 15.

Figure 11D:
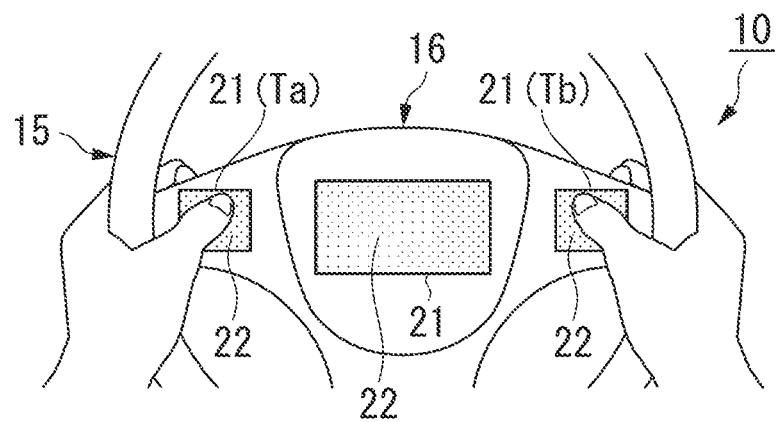
FIG. 11D is diagrams showing disposition examples of the operation surfaces of a plurality of touch pads in a vehicle input apparatus according to a sixth modification of the embodiment of the present invention.

Moreover, for example, in the sixth modification shown in FIG. 11D, the operation surfaces 22 of the two touch pads 21 (touch pad Ta and touch pad Tb) are disposed so as to be symmetrical with respect to the center surface perpendicular to the vehicle width direction of the vehicle including the center of the steering wheel 15 at positions which are deviated in the left side and the right side of the vehicle width direction from the center of the grip portion 16 in the neutral state of the steering wheel 15, and the operation surface 22 of the other touch pad 21 is disposed at the center on the grip portion 16.

Figure 11E:
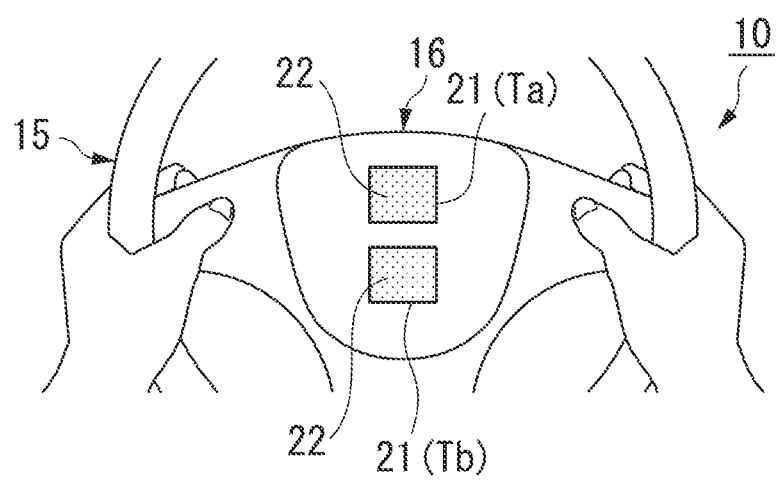
FIG. 11E is diagrams showing disposition examples of the operation surfaces of a plurality of touch pads in a vehicle input apparatus according to a seventh modification of the embodiment of the present invention.

In addition, for example, in the seventh modification shown in FIG. 11E, the operation surfaces 22 of the two touch pads 21 (touch pad Ta and touch pad Tb) are disposed at positions which are deviated in the upper side and lower side in the vertical direction from the center of the grip portion 16 in the neutral state of the steering wheel 15.

In the seventh modification, in the front view of the display screen 31, the left side display area 32 (display area A) among the two display areas 32 is associated with the operation surface 22 of the touch pad 21 (touch pad Ta) that is disposed so as to deviate in the upper side of the vertical direction from the center of the grip portion 16 at the neutral state of the steering wheel 15.

Moreover, in the front view of the display screen 31, the right side display area 32 (display area B) among the two display areas 32 is associated with the operation surface 22 of the touch pad 21 (touch pad Tb) that is disposed so as to deviate in the lower side of the vertical direction from the center of the grip portion 16 at the neutral state of the steering wheel 15.

Moreover, in the above-described embodiments, the operation surfaces 22 of the separate touch pads 21 that are associated with each of the plurality of display areas 32 divided in the display screen 31 are disposed at different positions on the grip portion 16 in the neutral state of the steering wheel 15. However, the present invention is not limited to this, for example, as an eighth modification shown in FIGS. 12A and 12B, separate display screens 31 (display screen DA and display screen DB) that are associated with each of the plurality of touch pads 21 may be disposed inside the vehicle according to a disposition relationship of the touch pads 21

(touch pad Ta and touch pad Tb) that are disposed at the plurality of (for example, two) different positions.

Figure 12A:
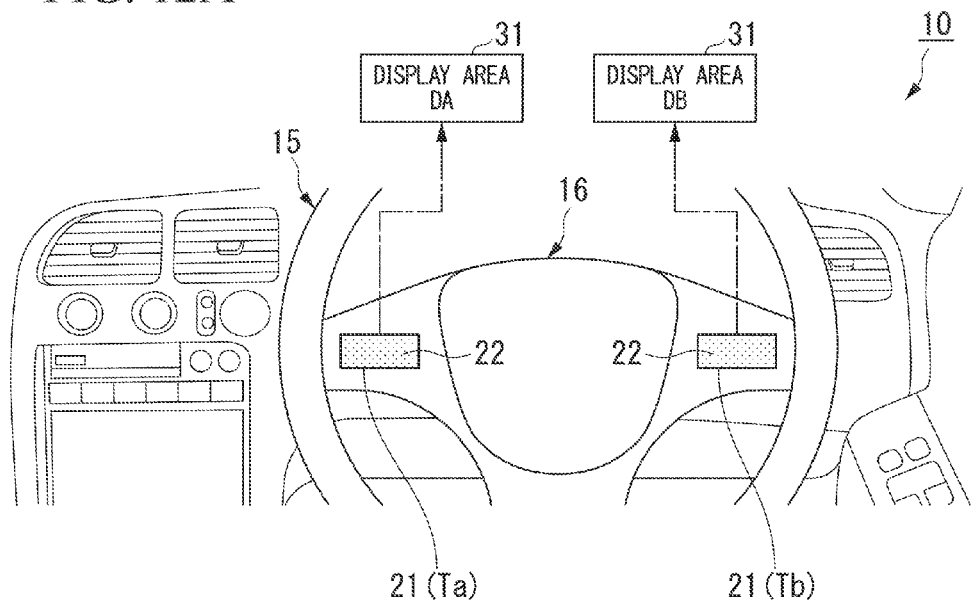
FIG. 12A is a diagram showing an example of a disposition relationship between the operation surfaces of a plurality of touch pads and a display screen that is associated with each of the operation surfaces of the plurality of touch pads in a vehicle input apparatus according to an eighth modification of the embodiment of the present invention.

For example, in the eighth modification shown in FIG. 12A, the operation surfaces 22 of the two touch pads 21 (touch pad Ta and touch pad Tb) are disposed so as to be symmetrical with respect to the center surface perpendicular to the vehicle width direction of the vehicle including the center of the grip portion 16 at predetermined locations that are deviated in the left side and the right side in the vehicle width direction from the center of the grip portion 16 in the neutral state of the steering wheel 15.

In addition, for example, two display screens 31 (display screen DA and display screen DB) are disposed at predetermined positions that are separated in the vehicle width direction on an instrument panel of the vehicle.

Moreover, one display screen 31 (display screen DA) is associated with the operation surface 22 of one touch pad 21 (touch pad Ta), and the other display screen 31 (display screen DB) is associated with the operation surface 22 of the other touch pad 21 (touch pad Tb).

Figure 12B:
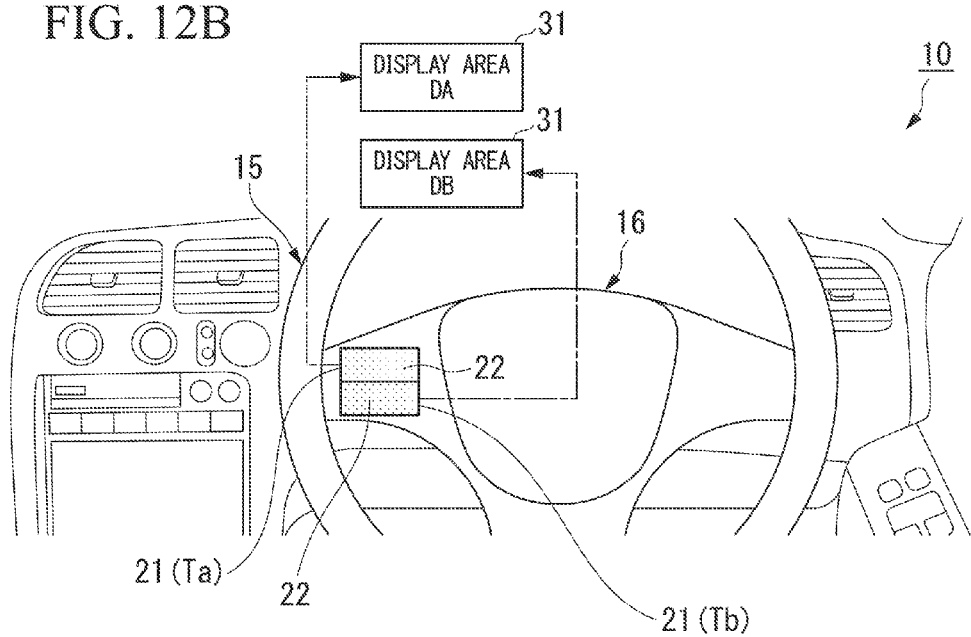
FIG. 12B is a diagram showing another example of a disposition relationship between the operation surfaces of a plurality of touch pads and a display screen that is associated with each of the operation surfaces of the plurality of touch pads in a vehicle input apparatus according to an eighth modification of the embodiment of the present invention.

For example, in the eighth modification shown in FIG. 12B, the operation surfaces 22 of the two touch pads 21 (touch pad Ta and touch pad Tb) are disposed so as to be adjacent in the vertical direction at a predetermined place that is deviated in one side (for example, left side) of the vehicle width direction from the center of the grip portion 16 in the neutral state of the steering wheel 15.

In addition, for example, two display screens 31 (display screen DA and display screen DB) are disposed at predetermined positions that are separated in the vertical direction on the instrument panel of the vehicle.

Moreover, one display screen 31 (display screen DA) is associated with the operation surface 22 of one touch pad 21 (touch pad Ta), and the other display screen 31 (display screen DB) is associated with the operation surface 22 of the other touch pad 21 (touch pad Tb).

In the eighth modification, since the disposition relationship of the touch pads 21 disposed at the plurality of different positions and the disposition relationship of the separate display screens 31 that are associated with each of the plurality of touch pads 21 are associated with each other, the operator can easily and intuitively understand the display screens 31 that are associated with each touch pad 21.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle input apparatus comprising;
a display screen that displays a cursor that indicates an operation item with respect to a predetermined operation object;
an input device that outputs signals according to a sliding operation using fingers of an operator on an operation surface;
a display control unit that controls a movement of the cursor on the display screen according to the signals that are output from the input device; and
a steering wheel that is provided in the vehicle,
wherein the input device includes a plurality of the operation surfaces that are disposed at a plurality of different positions within a range which is reachable by the fingers of an operator sitting in a driver's seat of the vehicle,
the plurality of operation surfaces are disposed at predetermined locations on a grip portion of the steering wheel, the predetermined locations being deviated from a center of the grip portion of the steering wheel in a neutral state to a left side and a right side in a vehicle width direction,
the display screen includes a plurality of display areas that are divided according to the number of the plurality of operation surfaces,
the plurality of display areas are disposed between outside ends of the plurality of operation surfaces with respect to the vehicle width direction in the steering wheel in the neutral state,
each of the plurality of operation surfaces is associated with separate display areas according to an absolute coordinate,
a left side operation surface among the plurality of operation surfaces is set so as to correspond to a left side display area among the plurality of display areas according to an absolute coordinate,
a right side operation surface among the plurality of operation surfaces is set so as to correspond to a right side display area among the plurality of display areas according to an absolute coordinate, and
an operation range is set on the display screen so that the cursor can only be moved within the range of the respective associated separate display areas, and
wherein
the operation ranges that are associated with adjacent display areas are set so as to overlap each other in the vicinity of a boundary, which is provided at a center position between the adjacent display areas and extends in a direction orthogonal to a longitudinal direction of the display screen, with respect to the plurality of display areas and the plurality of operation ranges, and
a position on the operation surface, which corresponds to a portion of the operation range overlapping the other operation range beyond the boundary, is a dead band.

2. The vehicle input apparatus according to claim 1, wherein the display area and the operation range are set so as to correspond according to an absolute coordinate, and
the cursor is displayed on the display screen at all times or when a sliding operation is performed on the operation surface, and the cursor is displayed so as to move in a direction according to the direction of the sliding operation starting from a position on the display screen corresponding to the operation surface in which a sliding operation is performed and the starting position of a sliding operation on the operation surface regardless of the immediately preceding position of the cursor on the display screen.

3. The vehicle input apparatus according to claim 1, wherein the display screen is disposed in front of the driver's seat, is configured of an approximately rectangular shape of which the longitudinal direction corresponds to the vehicle width direction of a vehicle, and is divided into the plurality of display areas by a boundary that extends in a direction perpendicular to the longitudinal direction.

4. The vehicle input apparatus according to claim 1, wherein the operation item includes a character input frame that causes the predetermined operation object to recognize handwritten characters input by a sliding operation, the cursor is a pointer that indicates a portion of the character according to the handwritten input being executed in the character input frame, and when the character input frame is displayed on the display screen, the operation range is set so as to correspond to a range of the character input frame.

* * * * *